US010922712B1

(12) United States Patent
Langdon

(10) Patent No.: US 10,922,712 B1
(45) Date of Patent: Feb. 16, 2021

(54) SYSTEM AND METHOD FOR GENERATING GEOGRAPHIC ZONE INFORMATION FOR CONSUMERS

(71) Applicant: Groupon, Inc., Chicago, IL (US)

(72) Inventor: Daniel Langdon, Santiago (CL)

(73) Assignee: Groupon, Inc., Chicago, IL (US)

( * ) Notice: Subject to any disclaimer, the term of this patent is extended or adjusted under 35 U.S.C. 154(b) by 895 days.

(21) Appl. No.: 14/869,548

(22) Filed: Sep. 29, 2015

Related U.S. Application Data

(60) Provisional application No. 62/057,157, filed on Sep. 29, 2014, provisional application No. 62/057,162, filed on Sep. 29, 2014, provisional application No. 62/057,168, filed on Sep. 29, 2014, provisional application No. 62/057,172, filed on Sep. 29, 2014, provisional application No. 62/057,176, filed on Sep. 29, 2014.

(51) Int. Cl.
*G06Q 30/02* (2012.01)

(52) U.S. Cl.
CPC ..... *G06Q 30/0243* (2013.01); *G06Q 30/0205* (2013.01)

(58) Field of Classification Search
CPC combination set(s) only.
See application file for complete search history.

(56) References Cited

U.S. PATENT DOCUMENTS

| | | | |
|---|---|---|---|
| 6,269,361 B1 | 7/2001 | Davis et al. | |
| 8,213,617 B1 | 7/2012 | Appleton | |
| 8,458,072 B1 | 6/2013 | Collins | |
| 9,178,933 B1 * | 11/2015 | Soland | H04L 67/306 |
| 9,756,458 B1 | 9/2017 | Chein et al. | |
| 2003/0004802 A1 | 1/2003 | Callegari | |
| 2004/0186769 A1 * | 9/2004 | Mangold | G06Q 30/02 705/14.58 |
| 2006/0287810 A1 | 12/2006 | Sadri et al. | |
| 2007/0207816 A1 | 9/2007 | Spain | |
| 2009/0089149 A1 | 4/2009 | Lerner et al. | |
| 2009/0292463 A1 * | 11/2009 | Chase | G01C 21/343 701/533 |
| 2010/0153292 A1 | 6/2010 | Zheng et al. | |
| 2011/0178849 A1 | 7/2011 | Rane et al. | |

(Continued)

OTHER PUBLICATIONS

Bureau of Economic Analysis (BEA), US Department of Commerce, News Release, BEA 14-25, Jun. 11, 2014.*

(Continued)

*Primary Examiner* — Mario C. Iosif

(74) *Attorney, Agent, or Firm* — Alston & Bird LLP

(57) ABSTRACT

Embodiments provide computer apparatuses, computer systems and computer-executable methods for generating geographic zone information associated with a consumer. A method includes receiving a first geographic location associated with the consumer, and programmatically identifying a first geographic zone associated with the first geographic location. The method also includes programmatically generating a first importance score associated with the first geographic zone and associated with the consumer. The method also includes storing, on a non-transitory computer-readable medium, the first geographic zone and the first importance score associated with the consumer.

21 Claims, 19 Drawing Sheets

(56) References Cited

U.S. PATENT DOCUMENTS

| | | |
|---|---|---|
| 2011/0227699 A1 | 9/2011 | Seth et al. |
| 2011/0231223 A1 | 9/2011 | Winters |
| 2011/0302155 A1 | 12/2011 | Yan et al. |
| 2012/0220308 A1* | 8/2012 | Ledlie ............... H04W 4/021 455/456.1 |
| 2012/0303626 A1 | 11/2012 | Friedmann et al. |
| 2013/0073422 A1 | 3/2013 | Moore et al. |
| 2013/0103697 A1 | 4/2013 | Hill et al. |
| 2013/0129084 A1 | 5/2013 | Appleton |
| 2013/0159325 A1 | 6/2013 | Polonsky et al. |
| 2013/0297422 A1 | 11/2013 | Hunter et al. |
| 2013/0321397 A1 | 12/2013 | Chen et al. |
| 2014/0019461 A1 | 1/2014 | Bredenberg et al. |
| 2014/0156223 A1 | 6/2014 | Toomre et al. |
| 2014/0172573 A1 | 6/2014 | Saurabh |
| 2014/0195530 A1* | 7/2014 | Milton ............... G06Q 30/02 707/734 |
| 2014/0257938 A1 | 9/2014 | Green et al. |
| 2014/0279196 A1 | 9/2014 | Wilson et al. |
| 2014/0337123 A1* | 11/2014 | Nuernberg ......... G06Q 30/0246 705/14.45 |
| 2015/0038162 A1* | 2/2015 | Duleba ............... H04L 67/18 455/456.1 |
| 2015/0169839 A1 | 6/2015 | Zhang et al. |
| 2015/0278211 A1* | 10/2015 | Voronel ............. G06F 16/24578 707/728 |
| 2015/0334168 A1* | 11/2015 | Kosslyn ................. H04L 67/10 709/204 |

OTHER PUBLICATIONS

Su X. et al., "A Survey of Collaborative Filtering Techniques", Feb. 9, 2009, Hindawi Publishing Corporation, Advances in Artificial Intelligence, V.2009, pp. 1-2 and 15. (Year: 2009).

* cited by examiner

SYSTEM AND METHOD FOR GENERATING GEOGRAPHIC ZONE INFORMATION FOR CONSUMERS

CROSS-REFERENCE TO RELATED APPLICATIONS

This application claims the benefit of U.S. Provisional Patent Application No. 62/057,157, titled "System and Method for Generating Geographic Zone Information for Consumers," filed Sep. 29, 2014, which is hereby incorporated by reference in its entirety. This application further claims the benefit of U.S. Provisional Patent Application No. 62/057,162, titled "System and Method for Generating Geographic Zone Information for Commercial Entities," U.S. Provisional Patent Application No. 62/057,168, titled "System and Method for Generating Purchase Recommendations Based on Geographic Zone Information," U.S. Provisional Patent Application No. 62/057,172, titled "System and Method for Detecting Consumer Hot-Spots Based on Geographic Zone Information," and U.S. Provisional Patent Application No. 62/057,176, titled "System and Method for Detecting Commercial Hot-Spots Based on Geographic Zone Information," each of which was filed Sep. 29, 2014, and each of which is hereby incorporated by reference in its entirety.

TECHNOLOGICAL FIELD

Example embodiments of the present invention relate generally to geographic zone information for entities.

BACKGROUND

Certain commercial entities consider the geographic proximity of a consumer to a commercial item (e.g., product, service, experience, promotion) or a commercial entity (e.g., merchant) in recommending the commercial item or entity to the consumer. In this regard, areas for improving conventional techniques for automated and programmatic determination and use of geographic overlap data have been identified and technical solutions have been implemented in exemplary embodiments.

BRIEF SUMMARY

In accordance with one exemplary non-limiting embodiment, a computer-executed method is provided. The method includes receiving, via a network device, a first geographic location associated with a consumer. The method also includes programmatically identifying a first geographic zone associated with the first geographic location. The method also includes programmatically generating a first consumer importance score associated with the first geographic zone and associated with the consumer. The method further includes storing, on a non-transitory computer-readable medium, the first geographic zone and the first consumer importance score associated with the consumer.

In accordance with another exemplary non-limiting embodiment, a computer apparatus is provided. The computer apparatus includes a network device for receiving a first geographic location associated with a consumer. The computer apparatus also includes a geographic zone designation engine configured to programmatically identify a first geographic zone associated with the first geographic location. The computer apparatus also includes an importance generation engine configured to programmatically generate a first consumer importance score associated with the first geographic zone and associated with the consumer. The computer apparatus further includes a non-transitory computer-readable medium for storing the first geographic zone and the first consumer importance score associated with the consumer.

In accordance with another exemplary non-limiting embodiment, a non-transitory computer-readable medium is provided. The computer-readable medium has encoded thereon one or more computer-executable instructions that, when executed on a processor of a computing device, cause a computer-executed method to be performed. The method includes receiving, via a network device, a first geographic location associated with a consumer. The method also includes programmatically identifying a first geographic zone associated with the first geographic location. The method also includes programmatically generating a first consumer importance score associated with the first geographic zone and associated with the consumer. The method further includes storing, on a non-transitory computer-readable medium, the first geographic zone and the first consumer importance score associated with the consumer.

In accordance with another exemplary non-limiting embodiment, a computer-executed method is provided. The method includes receiving, via a network device, a first geographic location associated with a commercial item or entity. The method also includes programmatically identifying a first geographic zone associated with the first geographic location. The method also includes programmatically generating a first importance score associated with the first geographic zone and associated with the commercial item or entity. The method further includes storing, on a non-transitory computer-readable medium, the first geographic zone and the first importance score associated with the commercial item or entity.

In accordance with another exemplary non-limiting embodiment, a computer apparatus is provided. The computer apparatus includes a network device configured to receive a first geographic location associated with a commercial item or entity. The computer apparatus also includes a geographic zone designation engine configured to programmatically identify a first geographic zone associated with the first geographic location. The computer apparatus also includes an importance generation engine configured to programmatically generate a first importance score associated with the first geographic zone and associated with the commercial item or entity. The computer apparatus further includes a non-transitory computer-readable medium for storing the first geographic zone and the first importance score associated with the commercial item or entity.

In accordance with another exemplary non-limiting embodiment, a non-transitory computer-readable medium is provided. The computer-readable medium has encoded thereon one or more computer-executable instructions that, when executed on a processor of a computing device, cause a computer-executed method to be performed. The method includes receiving, via a network device, a first geographic location associated with a commercial item or entity. The method also includes programmatically identifying a first geographic zone associated with the first geographic location. The method also includes programmatically generating a first importance score associated with the first geographic zone and associated with the commercial item or entity. The method further includes storing, on a non-transitory computer-readable medium, the first geographic zone and the first importance score associated with the commercial item or entity.

In accordance with another exemplary non-limiting embodiment, a computer-executed method is provided. The method includes receiving, via a network device, a first predetermined geographic zone, a first consumer importance score associated with a consumer for the first predetermined geographic zone, and a first importance score associated with a commercial item or entity for the first predetermined geographic zone. The method also includes programmatically generating an overlap score based on the first consumer importance score and the first importance score. The method also includes programmatically generating a relevancy score based on the overlap score, the relevancy score indicating a probability that the commercial item or entity is of relevance to the consumer. The method also includes storing, on a non-transitory computer-readable medium, the relevancy score in association with identifications of the consumer and the first commercial item or entity. The method further includes, based on the relevancy score, transmitting computer-executable instructions via the network device to a computing device associated with the consumer to cause the computing device to render a representation of the commercial item or entity.

In accordance with another exemplary non-limiting embodiment, a computer apparatus is provided. The computer apparatus includes a network device for receiving a first predetermined geographic zone, a first consumer importance score associated with a consumer for the first predetermined geographic zone, and a first importance score associated with a commercial item or entity for the first predetermined geographic zone. The computer apparatus also includes an overlap detection engine configured to programmatically generate an overlap score based on the first consumer importance score and the first importance score. The computer apparatus also includes a recommendation generation engine configured to programmatically generate a relevancy score based on the overlap score, the relevancy score indicating a probability that the commercial item or entity is of relevance to the consumer. The computer apparatus also includes a non-transitory computer-readable medium for storing the relevancy score in association with identifications of the consumer and the first commercial item or entity. The computer apparatus further includes an electronic communication generator module configured to transmit, based on the relevancy score, computer-executable instructions via the network device to a computing device associated with the consumer to cause the computing device to render a representation of the commercial item or entity.

In accordance with another exemplary non-limiting embodiment, a non-transitory computer-readable medium is provided. The computer-readable medium has encoded thereon one or more computer-executable instructions that, when executed on a processor of a computing device, cause a computer-executed method to be performed. The method includes receiving, via a network device, a first predetermined geographic zone, a first consumer importance score associated with a consumer for the first predetermined geographic zone, and a first importance score associated with a commercial item or entity for the first predetermined geographic zone. The method also includes programmatically generating an overlap score based on the first consumer importance score and the first importance score. The method also includes programmatically generating a relevancy score based on the overlap score, the relevancy score indicating a probability that the commercial item or entity is of relevance to the consumer. The method also includes storing, on a non-transitory computer-readable medium, the relevancy score in association with identifications of the consumer and the first commercial item or entity. The method further includes, based on the relevancy score, transmitting computer-executable instructions via the network device to a computing device associated with the consumer to cause the computing device to render a representation of the commercial item or entity.

In accordance with another exemplary non-limiting embodiment, a computer-executed method is provided. The method includes receiving, via a network device, indication of a first set of geographic zones associated with a first consumer. The method also includes receiving, via the network device, indication of a second set of geographic zones associated with one or more consumers who purchased from a first merchant. The method also programmatically generating an overlap score based on the first and second sets of geographic zones. The method also includes, based on the overlap score, determining if the first merchant is geographically accessible to the first consumer. The method further includes displaying, on a visual display device, identification of the first consumer associated with the first merchant.

In accordance with another exemplary non-limiting embodiment, a computer apparatus is provided. The computer apparatus includes a network device for receiving indication of a first set of geographic zones associated with a first consumer, and for receiving indication of a second set of geographic zones associated with one or more consumers who purchased from a first merchant. The computer apparatus also includes an overlap generation engine configured to programmatically generate an overlap score based on the first and second sets of geographic zones. The computer apparatus also includes a recommendation generation engine configured to, based on the overlap score, determine if the first merchant is geographically accessible to the first consumer. The computer apparatus further includes a visual display device for displaying identification of the first consumer associated with the first merchant.

In accordance with another exemplary non-limiting embodiment, a non-transitory computer-readable medium is provided. The computer-readable medium has encoded thereon one or more computer-executable instructions that, when executed on a processor of a computing device, cause a computer-executed method to be performed. The method includes receiving, via a network device, indication of a first set of geographic zones associated with a first consumer. The method also includes receiving, via the network device, indication of a second set of geographic zones associated with one or more consumers who purchased from a first merchant. The method also includes programmatically generating an overlap score based on the first and second sets of geographic zones. The method also includes, based on the overlap score, determining if the first merchant is geographically accessible to the first consumer. The method further includes displaying, on a visual display device, identification of the first consumer associated with the first merchant.

In accordance with another exemplary non-limiting embodiment, a computer-executed method is provided. The method includes receiving, via a network device, a first predetermined geographic zone, a first consumer importance score associated with a first consumer for the first predetermined geographic zone, and a second consumer importance score associated with a second consumer for the first predetermined geographic zone. The method also includes programmatically generating an overlap score based on the first and second consumer importance scores. The method also includes, based on the overlap score, programmatically determining if the first geographic zone is a consumer hot-spot. The method further includes storing, on a non-transitory computer-readable medium, the overlap score in association with an identification of the first geographic zone.

In accordance with another exemplary non-limiting embodiment, a computer apparatus is provided. The computer apparatus includes a network device for receiving a first predetermined geographic zone, a first consumer importance score associated with a first consumer for the first predetermined geographic zone, and a second consumer importance score associated with a second consumer for the first predetermined geographic zone. The computer apparatus also includes an overlap detection engine configured to programmatically generate an overlap score based on the first and second consumer importance scores, and, based on the overlap score, programmatically determine if the first geographic zone is a consumer hot-spot. The computer apparatus further includes a non-transitory computer-readable medium for storing the overlap score in association with an identification of the first geographic zone.

In accordance with another exemplary non-limiting embodiment, a non-transitory computer-readable medium is provided. The computer-readable medium has encoded thereon one or more computer-executable instructions that, when executed on a processor of a computing device, cause a computer-executed method to be performed. The method includes receiving, via a network device, a first predetermined geographic zone, a first consumer importance score associated with a first consumer for the first predetermined geographic zone, and a second consumer importance score associated with a second consumer for the first predetermined geographic zone. The method also includes programmatically generating an overlap score based on the first and second consumer importance scores. The method also includes, based on the overlap score, programmatically determining if the first geographic zone is a consumer hot-spot. The method further includes storing, on a non-transitory computer-readable medium, the overlap score in association with an identification of the first geographic zone.

In accordance with another exemplary non-limiting embodiment, a computer-executed method is provided. The method includes receiving, via a network device, a first predetermined geographic zone, a first importance score associated with a first commercial item or entity for the first predetermined geographic zone, and a second importance score associated with a second commercial item or entity for the first predetermined geographic zone. The method also includes programmatically generating an overlap score based on the first and second importance scores. The method also includes, based on the overlap score, programmatically determining if the first geographic zone is a commercial hot-spot. The method further includes storing, on a non-transitory computer-readable medium, the overlap score in association with an identification of the first geographic zone.

In accordance with another exemplary non-limiting embodiment, a computer apparatus is provided. The computer apparatus includes a network device for receiving a first predetermined geographic zone, a first importance score associated with a first commercial item or entity for the first predetermined geographic zone, and a second importance score associated with a second commercial item or entity for the first predetermined geographic zone. The computer apparatus also includes an overlap detection engine configured to programmatically generate an overlap score based on the first and second importance scores, and, based on the overlap score, programmatically determine if the first geographic zone is a commercial hot-spot. The computer apparatus further includes a non-transitory computer-readable medium for storing the overlap score in association with an identification of the first geographic zone.

In accordance with another exemplary non-limiting embodiment, a non-transitory computer-readable medium is provided. The computer-readable medium has encoded thereon one or more computer-executable instructions that, when executed on a processor of a computing device, cause a computer-executed method to be performed. The method includes receiving, via a network device, a first predetermined geographic zone, a first importance score associated with a first commercial item or entity for the first predetermined geographic zone, and a second importance score associated with a second commercial item or entity for the first predetermined geographic zone. The method also includes programmatically generating an overlap score based on the first and second importance scores. The method also includes, based on the overlap score, programmatically determining if the first geographic zone is a commercial hot-spot. The method further includes storing, on a non-transitory computer-readable medium, the overlap score in association with an identification of the first geographic zone.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
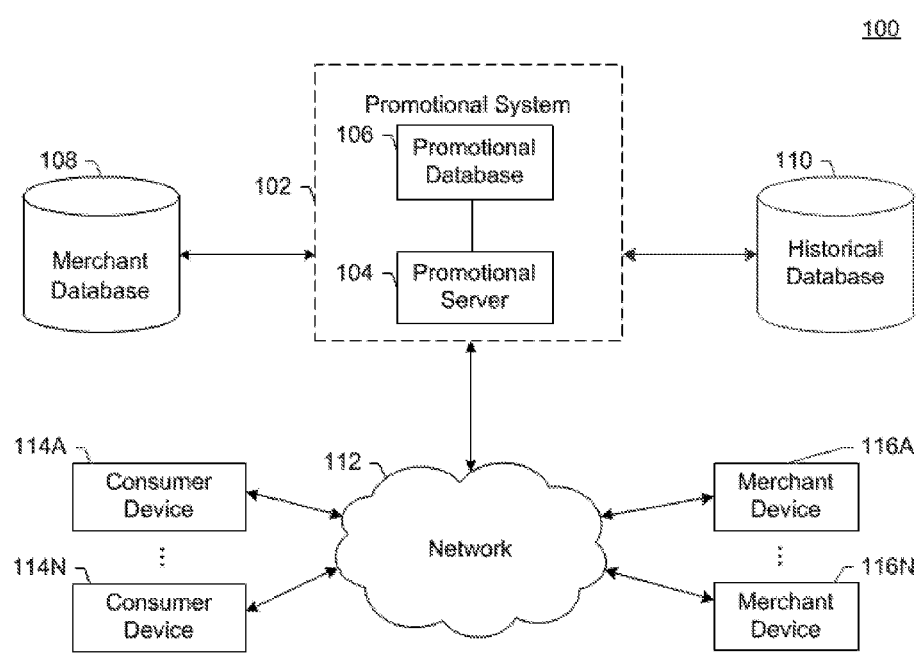
FIG. 1 is a block diagram illustrating an exemplary system within which exemplary embodiments may operate.

The accompanying drawings are not intended to be drawn to scale.

DETAILED DESCRIPTION

I. Overview

Exemplary embodiments provide computer systems, computer-executable methods and one or more non-transitory computer-readable media for automated and programmatic determination and use of geographic overlap data. In this regard, exemplary embodiments provide solutions to the technical problem of handling large numbers of location data in an intelligent, efficient and reliable manner. Exemplary embodiments may define, for each consumer, commercial item or commercial entity, one or more associated geographic zones. Each geographic zone may encompass one or more geographic location points associated with the consumer, commercial item or commercial entity. Embodiments thereby enable comparison of the geographic zones of two or more entities to determine an overlap score indicating the extent of the overlap between the zones, which makes it unnecessary to calculate exact actual distances between individual location points.

Exemplary geographic zones are fixed non-overlapping zones or areas that are assigned to a rigid spatial segmentation of the earth's surface. In one example, the geographic zones may be zip-codes. Zip-codes may be advantageous in that they conform to existing real-world political and geographical boundaries (e.g., rivers, bridges), and are of a reasonable size. Generating segmentations of variable adaptive sizes is not a trivial technical solution and is advantageous in exemplary embodiments. In another example, the geographic zones may be based on a grid of segmentation of latitudes and longitudes.

Certain conventional techniques treat the location of an entity (e.g., a consumer) as a single set of coordinates, and determine geographic proximity between two entities (e.g., a consumer and a merchant) by determining the actual or approximated geographic distance between the two entities. Certain conventional techniques also determine distances based on the closest locations between two entities, which significantly reduces the prediction value of the distances. In one example, embodiments identify and/or use a set of one or more geographical zones associated with an entity, in which each geographical zone may encompass a set of geographic locations. Certain exemplary embodiments determine geographic proximity between two or more entities based on the overlap between their geographic zones, without requiring the determination of actual point-to-point geographic distances. Since exemplary embodiments do not determine geographic proximity based on just the closest locations, the prediction value of the generated geographic overlap score is much higher than conventional techniques that consider only closest location data points.

Exemplary embodiments also significantly reduce the computational time and cost required to determine the geographical proximity between multiple entities as compared to conventional techniques. In one conventional technique, for each consumer and each commercial item or entity, each of the consumer's locations is compared with each of the commercial item/entity locations, and the closest point-to-point distance is used to determine the geographic proximity between the consumer and the commercial item/entity. The computational cost of this conventional technique is very high, on the order of $O(U*D*Lu*Ld)$, where:

U: total number of consumers

D: total number of commercial items/entities

Lu: average number of locations per consumer

Ld: average number of locations per commercial item/entity (e.g., merchant)

The values of Lu and Ld may become explosively high due to the ever-increasing use of mobile location data, which significantly increases the computational cost of conventional techniques, thus making the conventional techniques infeasible for determining geographic proximity.

Since exemplary embodiments use geographic zones rather than location points, the amount of location data required is typically orders of magnitude smaller, as denoted below.

Z: total number of geographic zones in a fixed segmentation

Zu: average number of geographic zones per consumer (where $Zu<=Lu$, and where Zu is potentially orders of magnitude smaller than Lu)

Zd: average number of geographic zones per commercial item/entity (where $Zd<=Ld$, and where Zd is potentially orders of magnitude smaller than Ld)

Since all consumers, commercial items and commercial entities are mapped onto the same uniquely-identified geographic zones in exemplary embodiments, there is a fixed and tractable number of geographic zones such that inverted lists may be generated. For example, a list of entities per geographic zone may be generated, and a list of all geographic zones per entity may be generated. Generation of these lists may have a computational cost on the order of $O(U*Zu+D*Zd)$. Determining intersections between the lists is linear on the number of intersections that actually exists, which has a computational cost on the order of $O(U*D*Z)$. Although the total number of possible intersections is $(U*D*Z)$, the number of actual intersections (I) is likely to be much lower. The computational cost of exemplary techniques is thus much lower than that of conventional techniques that determine point-to-point distances. The computational cost of exemplary intersection techniques is on the order of $O(U*Zu+D*Zd+I)$, which is much lower than $O(U*Lu+D*Ld+U*D*Z)$, which in turn is much lower than $O(U*D*\log (Lu)*Ld)$.

Certain conventional techniques treat multiple locations associated with an entity equally, i.e., as though all of the locations have an equal importance or relevance to the entity. In contrast, certain exemplary embodiments determine and/or use importance scores for the geographic zones associated with an entity, which enables embodiments to handle and process different geographic zones differently and in a more meaningful way based on their importance or relevance to the entity. For example, in exemplary embodiments, the geographic zone of a consumer's home address may be assigned a higher importance score than a geographic zone that the consumer rarely frequents.

Certain conventional techniques are deficient in how they recommend non-local commercial items that may be of interest to consumers. These non-local commercial items may include, for example, getaways, day trips, and the like. Certain conventional techniques consider a certain geographical radius around a consumer, and not a basic radius around the commercial entity itself. As a result, these conventional techniques may not recommend non-local items to a consumer because the item may be determined to be geographically distant from the consumer. Exemplary embodiments address these deficiencies by seamlessly including non-local items in a purchase recommendation system. In this regard, embodiments generate an intersection or overlap between the geographic zones of the consumer and the geographic zones of the item to programmatically indicate a likelihood or probability of the item and the consumer coexisting in the same or similar geographic zones. As a result, exemplary embodiments are able to seamlessly recommend non-local items to consumers without having to manually indicate (for example, using special flags or categories) that these non-local items are to be handled in a different manner than local items.

Certain conventional techniques are unable to handle entities for which insufficient location data is available. Exemplary embodiments compensate for this technical problem by using location data from other entities as well (e.g., entities that have similarities, such as consumers with similar interests and home addresses).

In certain embodiments, a commercial item may be any type of entity that may be purchased and sold including, but not limited to, a good, a product, a service, an experience, a promotion offered by a promotion and marketing service, and the like. A commercial entity may be a merchant or a consumer.

II. Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "consumer interface" may include any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "voucher" may include, but is not limited to, any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "geographic zone" refers to a geographic area that encompasses a plurality of geographic locations (each location indicated by a latitude value and a longitude value). Exemplary geographic zones are fixed unique non-overlapping zones or areas that are assigned to a rigid spatial segmentation of the earth's surface. In one example, the geographic zones may be zip-codes. In another example, the geographic zones may be based on a grid of segmentation of latitudes and longitudes.

As used herein, the term "geographic profile" refers to one or more geographic zones associated with a consumer, a commercial item or a commercial entity. The geographic profile may, in some cases, indicate a count and an importance score associated with each geographic zone.

As used herein, the term "importance score," in relation to a geographic zone in a geographic profile, refers to the relevance or importance of the geographic zone to a consumer, a commercial item or a commercial entity.

As used herein, the term "count," in relation to a geographic zone in a geographic profile, refers to a number of data points associated with the geographic zone in the geographic profile.

As used herein, the term "commercial item" refers to any item that may be purchased and sold including, but not limited to, a product, a good, a service, a promotion offered by a promotion and marketing service, and the like.

As used herein, the term "commercial entity" refers to any actor who may purchase or sell a commercial item including, but not limited to, a merchant (whether a corporation, an individual, a partnership), a service provide, a promotion and marketing service, a consumer, and the like.

As used herein, the terms "mobile computing device" and "mobile device" refer to any computing or communication device that is portable and is transported in normal usage (e.g., the iPhone™ mobile communication device, the Android™ mobile communication device, and the like), and that is capable of communication and that has sufficient processor power and memory capacity to perform the operations described herein. For example, and without limitation, a mobile computing device may include a smartphone, a table computer, a laptop computer, and the like.

As used herein, the term "module," encompasses hardware, software and/or firmware configured to perform one or more particular functions.

As used herein, the term "computer-readable medium" refers to a non-transitory storage hardware, non-transitory storage device or non-transitory computer system memory that may be accessed by a controller, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

III. System Architecture and Example Apparatus

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system 100 within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, information on geographic zones for a commercial item/entity, prior performance data on an item, future sales estimates for an item, demand data for an item, a cap or maximum limit on the number of units of an item for sale, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Figure 2:
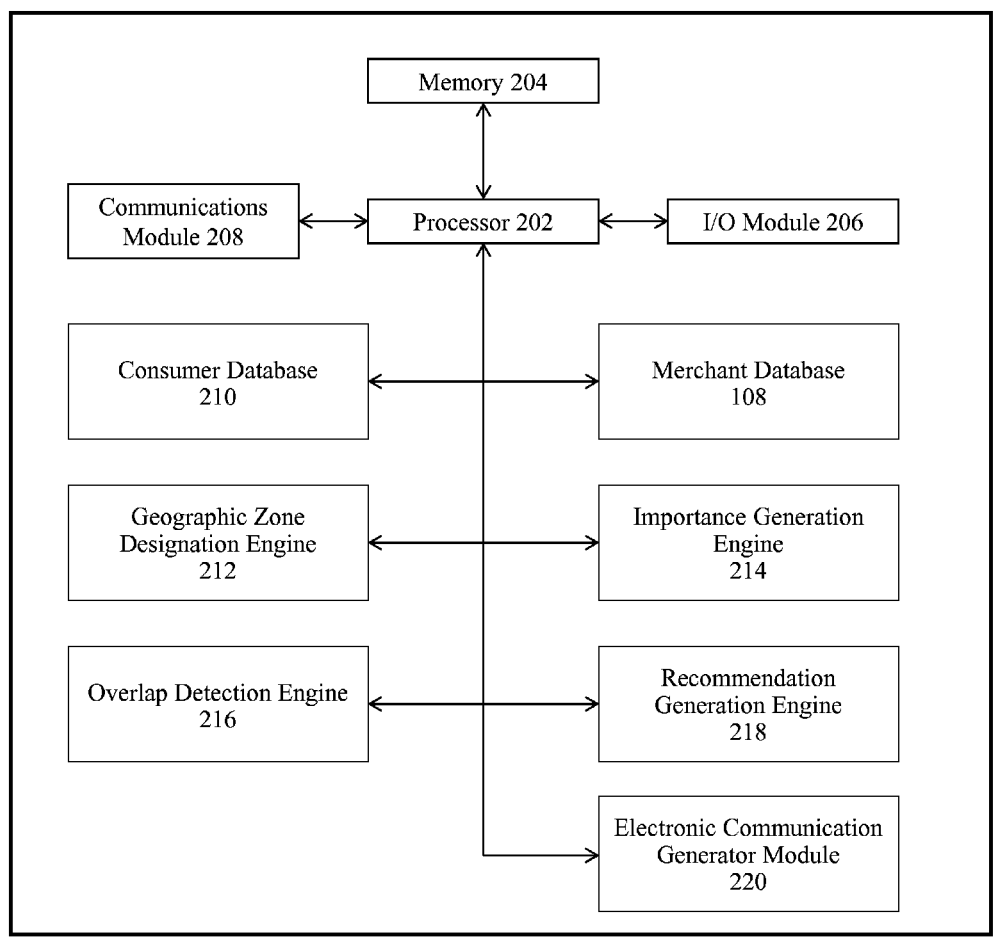
FIG. 2 is a block diagram illustrating exemplary modules of a computing device for use in a promotional server in accordance with certain exemplary embodiments.

IV. Example Apparatuses for Implementing Embodiments of the Present Invention The server 104 may be embodied by one or more computing systems, such as apparatus 200 shown in FIG. 2. As illustrated in FIG. 2, the apparatus 200 may include a processor 202, a memory 204, input/output circuitry 206, and communications circuitry 208. The apparatus 200 may be configured to execute the operations described above with respect to FIG. 1 and below with respect to FIG. 3. Although the components of FIG. 2 are described with respect to functional limitations, it should be understood that the particular implementations necessarily include the use of particular hardware. It should also be understood that certain of the components of FIG. 2 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In one embodiment, the processor 202 may be configured to programmatically access data from and store data to a consumer database 210 that may be used to store data on one or more consumers. Exemplary data may include, but is not limited to, one or more geographic locations associated with a consumer, one or more geographic zones associated with the consumer (and associated counts and importance scores), prior activity data (e.g., prior purchase data, prior travel data), profile data items (e.g., age, gender, occupation, interests), and the like.

In one embodiment, the processor 202 may be configured to programmatically access data from and store data to a commercial item or entity database 108 that may be used to store data on a commercial entity (e.g., merchant) or commercial item (e.g., product, service, promotion). Exemplary data may include, but is not limited to, one or more geographic locations associated with the commercial item or entity, one or more geographic zones associated with the commercial item or entity (and associated counts and importance scores), prior activity data (e.g., prior sales data), profile data items (e.g., category, subject matter), and the like.

Since location data is hardly static, location information in the consumer database 210 and the commercial item/entity database 108 may be updated periodically (e.g., every minute, every hour, every day, every week, and the like). In certain embodiments, two delta files may be generated periodically to update ageing location data. One delta file may be added to the working set of location data being currently used, and the other delta file may be scheduled for removal in the future. Each location measurement may be assigned a custom lifespan based, for example, on its type (e.g., whether it is mobile location data), the duration of time spent at the location, and the like. For example, a new location update may be received from a consumer's mobile phone. Certain embodiments may add the new location data to the same day's insertion queue to be added to the consumer's geographic profile on the next day. At the same time, given the lifespan of mobile location data (e.g., 45 days), certain embodiments may add the new location data to a removal queue for that last day of the lifespan. Both the insertion queue and the removal queue for the day on top of the working set of location data to update the location data.

In certain embodiments, for a particular entity recorded in the consumer database 210 or the commercial item/entity database 108, all geographic zones associated with the entity may be programmatically accessed simultaneously. In certain cases, the importance score and/or the count for each geographic zone may also be accessed. In certain cases, a database "get" command may be used to access this information.

In certain embodiments, for a particular geographic zone recorded in the consumer database 210 or the commercial item/entity database 108, all entities associated with the geographic zone may be programmatically accessed simultaneously. In certain cases, the importance value and/or the count for each entity and each geographic zone may also be accessed. In one non-limiting example, if a consumer A has a total of 100 location data points and was seen in a particular geographic zone 10 times, then the count for that geographic zone may be 10. Similarly, if a consumer B has a total of 5 location data points and was seen in a particular geographic zone 5 times, then the count for that geographic zone may be 5. In the above non-limiting example, the importance score for consumer A may be $10/100$ (i.e., 0.1), while the importance score for consumer B may be 5/5 (i.e., 1.0). In certain cases, a database "get" command may be used to access the information.

In certain embodiments, for a particular geographic zone recorded in the consumer database 210 or the commercial item/entity database 108, all entities of a particular type (e.g., only merchants) associated with the geographic zone may be programmatically accessed. In certain cases, the importance value and/or the count for each entity and each geographic zone may also be accessed. In certain cases, a database "get" command may be used to access the information.

In certain embodiments, multiple entries in the consumer database 210 or the commercial item/entity database 108 may be retrieved simultaneously using bulk queries.

In certain embodiments, filtering may be applied to more selectively retrieve data from the consumer database 210 or the commercial item/entity database 108.

In one embodiment, the apparatus 200 may include and the processor 202 may be configured to programmatically execute a geographic zone designation engine 212 that is programmed or configured to identify a geographic zone that encompasses a geographic location. The geographic zone designation engine 212 may take as input identification of a geographic location, and output identification of a geographic zone.

In one aspect, zip-codes may be used as geographic zones. For example, if a street address is located within a particular zip-code, then that zip-code may be identified as the geographic zone corresponding to the street address. In another aspect, the geographic zones may be based on a grid of segmentation of latitudes and longitudes. For example, a geographic area may be segmented into a grid based on partitioning each set of location coordinates by trimming their latitudes and longitudes to two decimal places, thus generating segments in a grid that roughly corresponds to a 1×1 km square. The latitude and longitude values may then be hashed to generate a unique geographic zone ID for the set of location coordinates. For example, the location data point having coordinates (38.01, −121.95) may be mapped to a geographic zone having an ID 136859805. Other types of geocoding may also be used in exemplary embodiments.

In certain embodiments, the geographic zone designation engine 212 may generate a "geographic profile" for an entity that includes a set of one or more geographic zones identified for the entity.

In one embodiment, the apparatus 200 may include and the processor 202 may be configured to programmatically execute an importance generation engine 214 that is programmed or configured to generate and assign an importance score to a geographic zone associated with a consumer, a commercial item or a commercial entity. The importance score may be a numeric value that quantitatively indicates the importance or relevance of a geographic zone to an entity. In certain embodiments, the importance generation engine 214 may take as input one or more geographic locations that include the following information for each location: the latitude value, the longitude value, the date and time of the collection of the location data, and the source of the location data (e.g., whether it is obtained from a mobile computing device associated with the entity, whether it is obtained from a source that verifies home or work address). The importance generation engine 214 may output, for each geographic location, a corresponding geographic zone that encompasses the geographic location.

In certain exemplary embodiments, an importance score for a geographic zone may be determined based on one or more of the following factors: whether the geographic zone encompasses a verified residential or work address of a consumer (in which case the importance score is adjusted upward), whether the geographic zone is in the vicinity of a geographic zone including a verified home or work address, whether the geographic zone encompasses a verified merchant or store location of a commercial item or entity (in which case the importance score is adjusted upward), whether the geographic zone is in the vicinity of a geographic zone including a verified merchant or store location, the frequency with which the entity is present in the geographic zone (the importance score being adjusted upward for higher frequencies), the frequency with which the entity is present in one or more geographic zones in the vicinity, the duration of time spent by the entity in the geographic zone (the importance score being adjusted upward for longer durations spent), whether the location data is transient mobile data (in which case the importance score is adjusted downward), the date and time of collection of the location data (the importance score being adjusted downward for older data), and the like.

In one embodiment, the apparatus 200 may include and the processor 202 may be configured to programmatically execute an overlap detection engine 216 that programmatically and automatically determines the geographic overlap between two sets of geographic zones associated with two entities. The geographic overlap may be associated with an overlap score that indicates the extent of the overlap. The geographic overlap score may be used as an indicator of geographic proximity between the entities.

In one embodiment, the apparatus 200 may include and the processor 202 may be configured to programmatically execute a recommendation generation engine 218. In certain embodiments, the recommendation generation engine 218 may programmatically determine one or more commercial items or entities to recommend to a consumer for purchase. In certain embodiments, the recommendation generation engine 218 may programmatically determine a merchant that is geographically accessible to a consumer, and/or a consumer who is in geographic proximity to a merchant (and/or to consumers who purchased from the merchant).

In one embodiment, the apparatus 200 may include and the processor 202 may be configured to programmatically execute an electronic communication generator module 220 that is programmed or configured to transmit computer-executable instructions to an external computing device. In one example, the computer-executable instructions may transmit a purchase order and cause the external computing device to initiate a purchase action. In another example, the computer-executable instructions may cause a notification of an item to be displayed on an external display device. The apparatus 200 may include circuitry configured to perform the functions associated with the electronic communication generator module 220 disclosed herein.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

V. Example Electronic Marketing Information Service Data Flow

Figure 3:
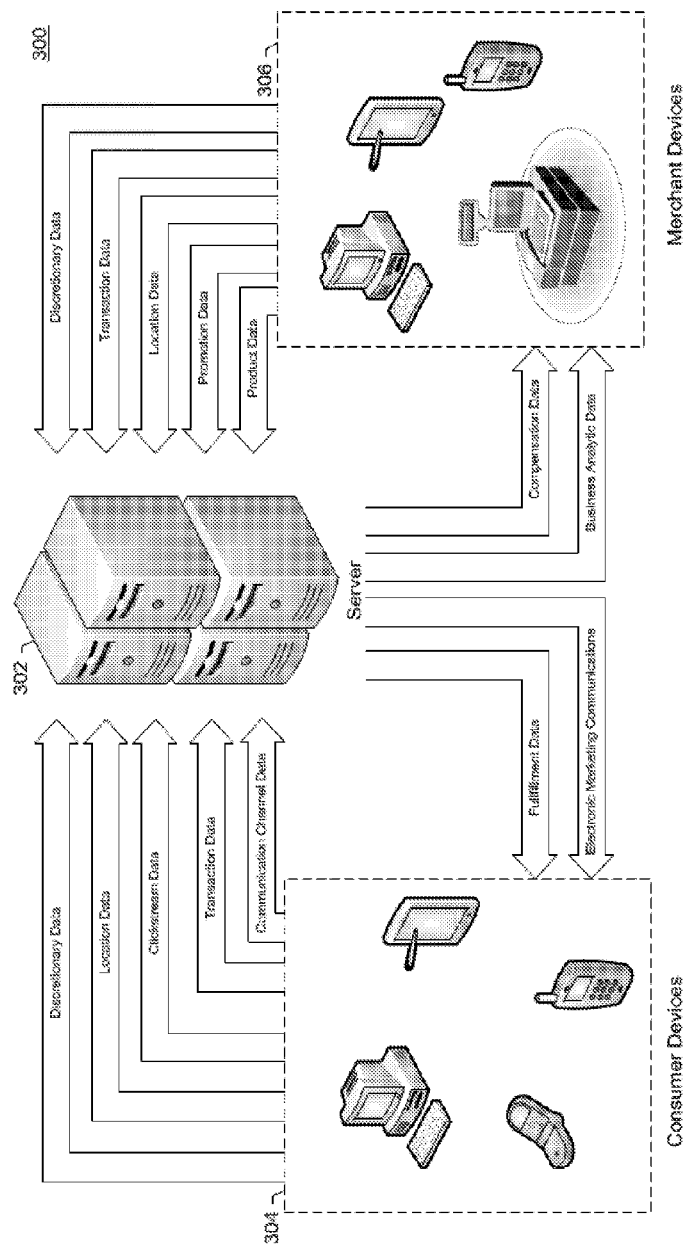
FIG. 3 is a block diagram illustrating exemplary modules of a computing device for use by a consumer or merchant in accordance with an exemplary embodiment.

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Figure 4:
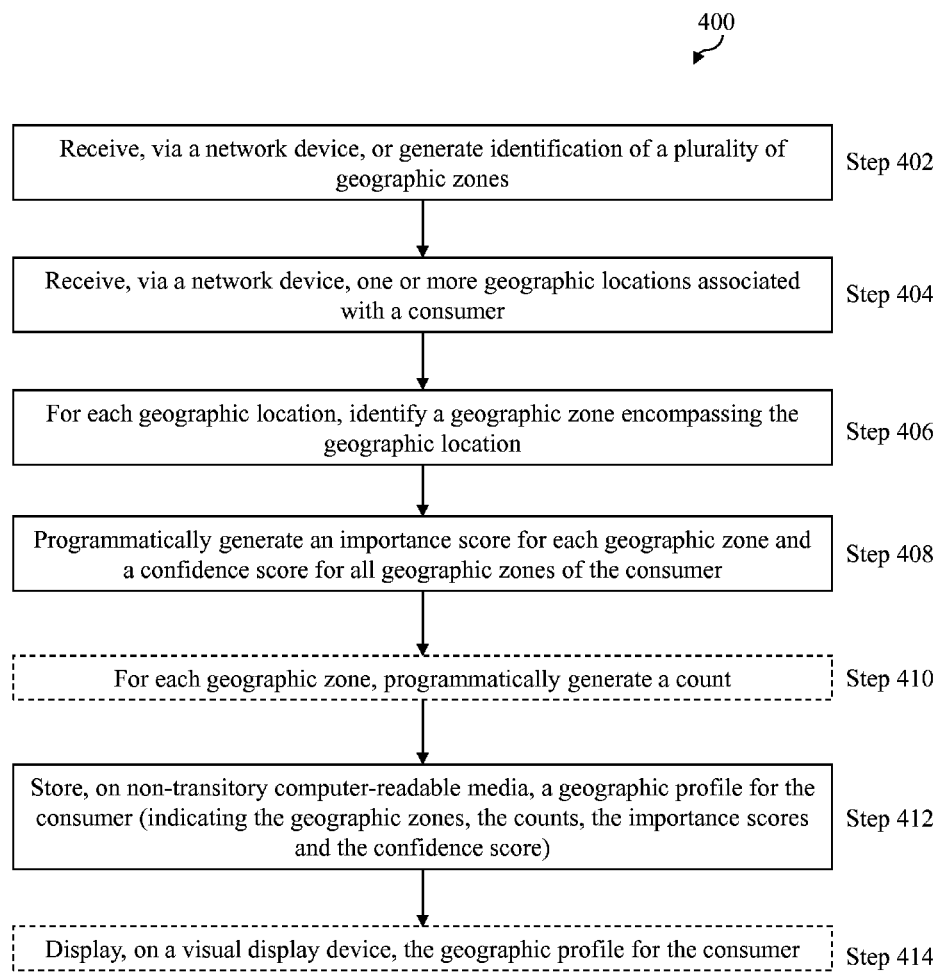
FIG. 4 is a flowchart illustrating a computer-executed method for generating geographic zone information for a consumer.

VI. Exemplary Techniques for Determining and Using Geographic Zone Information FIG. 4 is a flowchart illustrating a computer-executed method 400 for generating geographic zone information for a consumer. In step 402, the geographic zone designation engine 212 may receive, via a network device, or generate identification of a plurality of geographic zones. The geographic zones may be unique non-overlapping zones that make up a predetermined geographic area. Each geographic zone may encompass multiple geographic locations. In one example, geographic zones may be designated by zip-codes such that each geographic zone corresponds to a single zip-code.

In step 404, the geographic zone designation engine 212 may receive, via a network device, one or more geographic locations associated with a consumer. The geographic locations may include, but are not limited to, locations at which the consumer was previously physical present at least once, locations associated with the consumer (e.g., residential address, work address), and the like. In one example, a geographic location may indicate a GPS location (including, for example, a latitude value and a longitude value). In another example, a geographic location may indicate a street address.

In certain embodiments, the received geographical location data may be de-duplicated such that multiple location data points at or around the same location (and recorded within a predetermined time duration, for example, close together in time) are considered to be a single location data point. For example, if location data for a consumer every 15 minutes indicates that he stays in a single location (or moves little) for hours, the location may be considered to be a single location data point.

In step 406, for each geographic location, the geographic zone designation engine 212 may identify a geographic zone that encompasses the geographic location. In one example, if a street address is located within a particular zip-code, then that zip-code may be identified as the geographic zone corresponding to the street address.

In step 408, for each geographic zone identified in step 406, a importance score may be determined, the importance score being a numeric value that quantitatively indicates a level of importance or relevance of the geographic zone to the particular consumer. In certain cases, the importance score may be normalized such that importance scores all geographic zones associated with a consumer add up to 1.0.

In certain embodiments, for the unextended consumer geographic profile, a corresponding confidence score may be generated to indicate a level of confidence in the importance scores in the consumer geographic profile. The confidence score for a consumer geographic profile may indicate, for example, the amount of information or data that supports the importance scores for the geographic zones in the consumer geographic profile. In one example, the confidence score for an unextended consumer geographic profile (Cu) may be based on the total weighted sum of the importance values for that geographic zone (totalImportance), normalized between 0 and 1 by a sigmoidal function. The following equation may be used to generate the confidence score for a consumer (Cu):

$$Cu = 1/(1 + e^{(-1.5 * totalImportance + 3)})$$

In step 410, in certain embodiments, a count may be generated for each geographic zone. In one example, the count may be a numeric value that indicates the number of times the geographic zone was associated with the consumer, e.g., the number of times that the consumer was present at the geographic zone.

In step 412, a geographic profile for the consumer (indicating, for example, the geographic zones, the counts, the importance scores and the confidence score generated) may be stored on a non-transitory computer-readable storage medium.

In step 414, in certain non-limiting embodiments, information in the geographic profile for the consumer may be displayed on a visual display device.

In certain embodiments, for the importance scores of an extended consumer geographic profile, a corresponding confidence score may be generated to indicate a level of confidence in the importance scores. In one example, the confidence score for an extended consumer geographic profile (Cz) may be based on the total weighted sum of the importance values for that geographic zone (totalImportance), normalized between 0 and 1 by a sigmoidal function. The confidence score for the extended consumer geographic profile (Cz) may need to be based on a much larger amount of data than the confidence score for the unextended consumer geographic profile (Cu). The following equation may be used to generate the confidence score for a geographic zone (Cz):

$$Cz = 1/(1 + e^{(-0.015 * totalImportance + 3)})$$

In certain cases, a minimum score may be assigned to a commercial item or entity to include any geographic zone in a consumer's geographic profile. This approach, like random walk or page-rank, creates a non-zero probability to obtain and recommend a far-away commercial item or entity to a consumer. This minimum score for a random jump may be trained with data.

Although the above embodiments are described with reference to consumer data, similar techniques may be used to generate a confidence score for an extended geographic profile for a commercial entity (e.g., a merchant).

Figure 5:
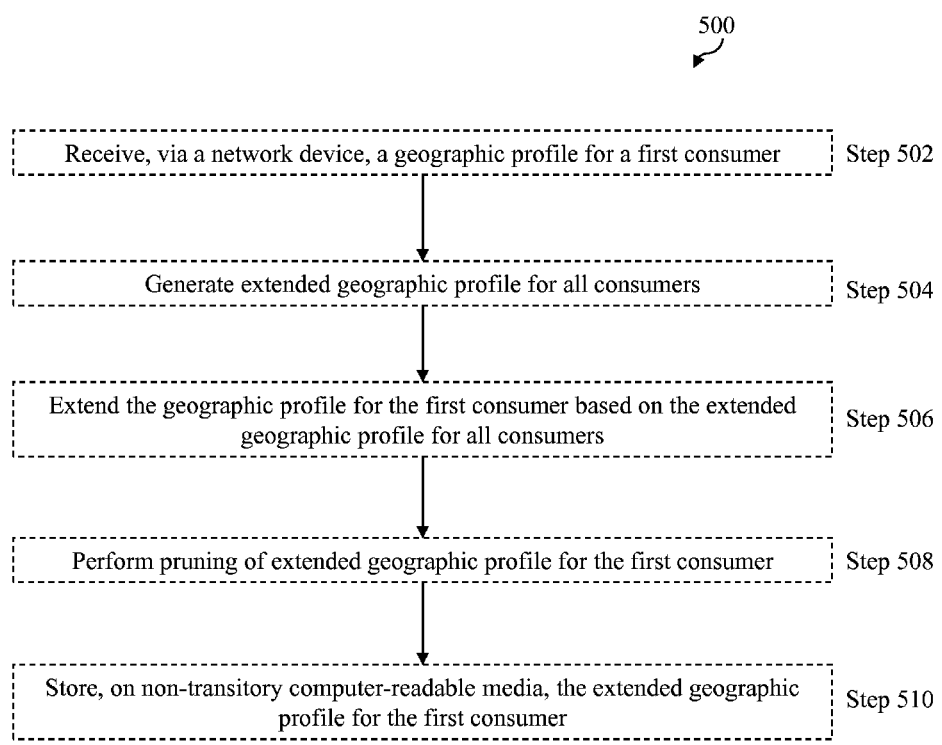
FIG. 5 is a flowchart illustrating a computer-executed method for generating an extended consumer geographic profile.

FIG. 5 is a flowchart illustrating a computer-executed method 500 for generating an extended or expanded consumer geographic profile for a particular consumer (i.e., a first consumer). In this exemplary method, the first consumer's geographic profile (including an indication of geographic zones that the first consumer was present in at least once) may be expanded or extended based on information on geographic zones in the profiles of a plurality of consumers (e.g., all known consumers). That is, the geographic profile of the first consumer may be extended or expanded based on what is known about the geographic profiles of all of the consumers. In one non-limiting example, the information on all of the consumers may indicate which geographic zones tend to coexist in the consumers' profiles or are correlated in the consumers' profiles.

In step 502, data on the first consumer's unextended geographic profile may be received, via a network device. The geographic profile may indicate, for example, one or more geographic zones associated with the first consumer, one or more importance scores associated with the geographic zones, and a confidence score for the geographic profile.

In certain non-limiting embodiments, in collaborative filtering, a consumer or merchant geographic profile may be extended or expanded to account for correlations between geographic zones across multiple profiles for the same type or entity (e.g., merchant or consumer). In one example, a consumer geographic profile may be extended or expanded based on the geographic profiles for all of the consumers. In another example, a merchant geographic profile may be extended or expanded based on the geographic profiles for all of the merchants. For example, if a merchant is at the corner of a zip-code and a consumer is close to the merchant's zip-code but just beyond the zip-code's boundary, the intersection between the merchant's zip-code and the consumer's zip-code may be zero although the consumer is a short distance away from the merchant. This may result in poor recommendations. The extended or expanded information provides an understanding of how easy it is to go from one geographic zone to another and how many consumers do so.

In step 504, an extended geographic profile may be generated for all consumers to determine, for each geographic zone, which other geographic zones are typically seen along it on consumers' profiles. In one exemplary non-limiting embodiment, the following technique may be used to generate the extended geographic profile for all consumers to generate a Z*Z matrix.

For each consumer
  a. For each geographic zone z1 in the consumer's profile
   1. Add the counts and importance scores of z2 on the (z1, z2) coordinate In one exemplary embodiment, the generated matrix may be made sparse by discarding all insignificant importance scores (i.e., scores below a threshold value or percentage).

In step 506, the geographic profile for the first consumer may be extended or expanded based on the extended geographic profile generated in step 504. In certain cases, the data in the extended geographic profile generated in step 504 may be normalized and weighted before extending the first consumer's geographic profile. A vector of normalized importance scores for geographic zones associated with the first consumer may be used. The vector may be denoted as [Iu1 . . . IuN] where N represents the total number of geographic zones for the first consumer. A single confidence score (Cu) associated with the first consumer may also be received. For the geographic zones in the first consumer's geographic profile, a matrix of cross-zone importance scores may be accessed or generated. The matrix may be denoted as [[Iz11 . . . Iz1M] . . . [IzNM . . . IzNM]].

The vector of extended importance scores for all consumers may be denoted as [Ie1 . . . IeN], where Ie represents an importance score for an extended geographic profile, and N represents the total number of geographic zones for the first consumer after profile extension. In one example, the vector of extended importance scores for all consumers may be generated by the weighted sum: Iu1*[[Iz11 . . . Iz1M]+ . . . +IuN*[IzN1 . . . IzNM]].

A vector or matrix of cross-zone confidence scores for the first consumer related to the outcome vector of step 504 may also be generated. The vector or matrix of confidence scores for the first consumer may be denoted as [Cz1 . . . CzN]. An extended confidence score (Ce) for all consumers may be generated in relation to the vector of extended importance scores. In one example, the extended confidence score for all consumers may be generated as the summation of each product of an unextended importance score and a corresponding cross-geographic zone confidence score, as represented below.

$$Ce=Iu1*Cz1+ \ldots +IuN*CzN$$

A merge factor (alpha) may be generated between the first consumer's unextended geographic profile (as received or determined in step 502) and the extended geographic profile for all consumers (as received or indicated in step 504) by balancing the confidence scores of each. In one example, the merge factor (alpha) may be generated based on the confidence score of the extended geographic profile for all consumers, the confidence score of the first consumer's unextended geographic profile, and a custom weight (K) that determines the balance between the first consumer's unextended geographic profile and the extended geographic profile for all consumers. The merge factor (alpha) and/or the custom weight (K) may be set manually in some non-limiting embodiments, as part of a standard configuration and/or on a per-query basis. In one example, the merge factor (alpha) may be determined as follows:

$$alpha=K*Cu/(Cu+Ce)$$

The first consumer's unextended geographic profile may be merged with the extended geographic profile for all consumers to generate a final vector of importance values and a final confidence score for the first consumer. In one example, the final vector of first consumer's importance scores (I) may be determined as follows:

$$I=alpha*[Iu1 \ldots IuN]+(1-alpha)*[Ie1 \ldots IeN]$$

In one example, the final confidence score (C) may be determined as follows:

$$C=alpha*Cu+(1-alpha)*Ce$$

In step 508, in certain embodiments, the first consumer's extended geographic profile generated in step 506 may be pruned or trimmed to reduce their sizes and/or eliminate the largest profiles. In one example, all geographic zones in the profile having importance scores less than a global threshold may be removed. In another example, all importance scores for a given consumer geographic profile may be normalized and then trimmed based on a threshold. In another example, the size of each consumer geographic profile may be trimmed to an arbitrary maximum size. In another example, the size of each consumer geographic profile may be trimmed to a relatively large number that guarantees richness of the profile (e.g., about 500 zones in the profile). The sizes may be re-normalized, and profiles that are likely to have little or no impact may be eliminated (e.g., importance scores less than about 0.01). In another example, an adaptive threshold may be selected, and the consumer geographic profile sizes may be taken as an input variable. Then, profiles having sizes that exceed the adaptive threshold may be eliminated. In another example, an adaptive size limit may be set and used to trim consumer geographic profiles based on their sizes.

In step 510, the final vector of importance scores (I) and the final confidence score (C) may be stored on a non-transitory computer-readable storage medium. In certain embodiments, the final vector of importance values (I) generated in FIG. 5 may be used in the methods of FIGS. 7-11 whenever importance values are used in the methods, and the final confidence score (C) may be used whenever a consumer confidence score is used.

Figure 6A:
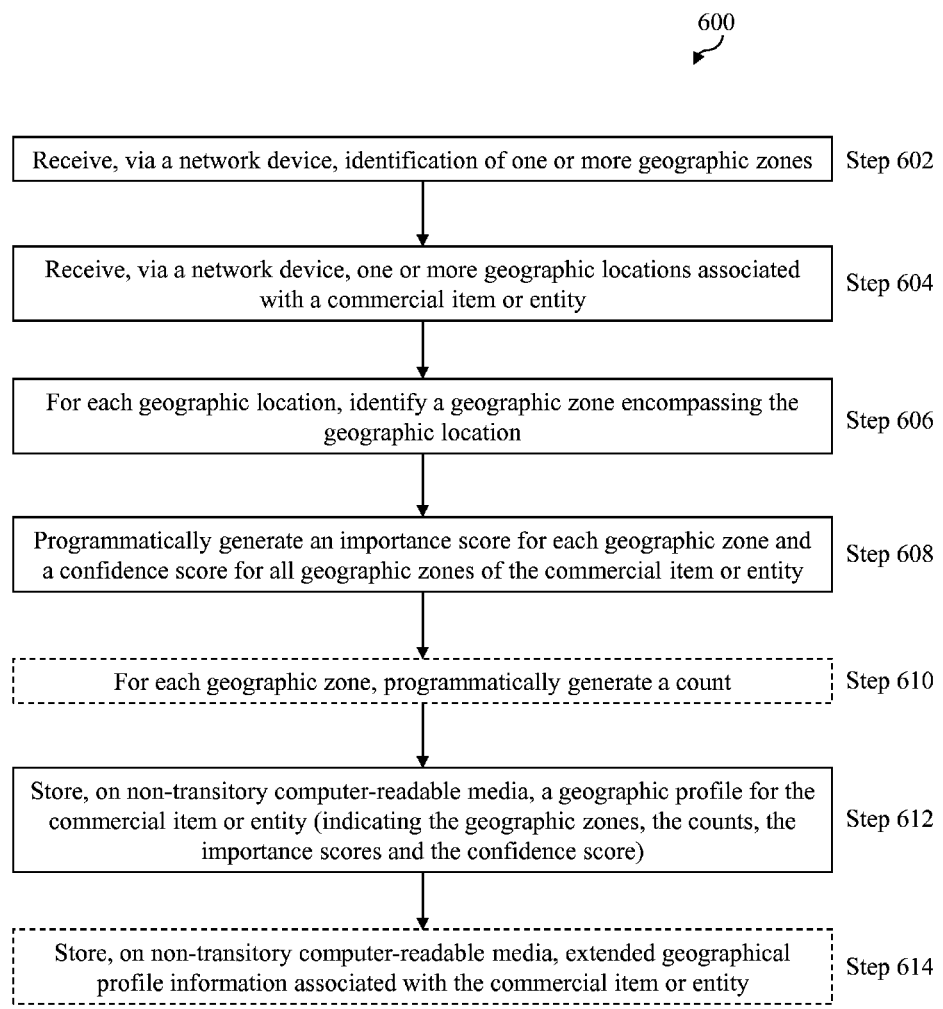
FIG. 6A is a flowchart illustrating a computer-executed method for generating geographic zone information for a commercial item or entity.

FIG. 6A is a flowchart illustrating a computer-executed method 600 for generating geographic zone information for a commercial item or entity. In step 602, the geographic zone designation engine 212 may receive, via a network device, or generate identification of a plurality of geographic zones. The geographic zones may be unique non-overlapping zones that make up a predetermined geographic area. Each geographic zone may encompass multiple geographic locations. In one example, geographic zones may be designated by zip-codes such that each geographic zone corresponds to a single zip-code.

In step 604, the geographic zone designation engine 212 may receive, via a network device, one or more geographic locations associated with a commercial item or entity. The geographic locations may include, but are not limited to, locations at which the commercial item or entity was previously physical present at least once, locations associated with the commercial item or entity (e.g., merchant address, store address), and the like. In one example, a geographic location may indicate a GPS location (including, for example, a latitude value and a longitude value). In another example, a geographic location may indicate a street address.

In step 606, for each geographic location, the geographic zone designation engine 212 may identify a geographic zone that encompasses the geographic location. In one example, if a street address is located within a particular zip-code, then that zip-code may be identified as the geographic zone corresponding to the street address.

In step 608, for each geographic zone identified in step 606, an importance score may be determined, the importance score being a numeric value that quantitatively indicates a level of importance or relevance of the geographic zone to the particular commercial item or entity. In certain cases, the importance score may be normalized such that importance scores for all geographic zones associated with a commercial item or entity add up to 1.0. In certain embodiments, for the geographic zones in a profile, a corresponding confidence score may also be generated to indicate a level of confidence in the importance scores.

In step 610, in certain embodiments, a count may be generated for each geographic zone. In one example, the count may be a numeric value that indicates the number of times the geographic zone was associated with the commercial item or entity, e.g., the number of times that the commercial item or entity was present at the geographic zone.

In step 612, a geographic profile for the commercial item or entity (indicating, for example, the geographic zones, the counts, the importance scores and the confidence score generated) may be stored on a non-transitory computer-readable storage medium.

In step 614, in certain non-limiting embodiments, information in the geographic profile for the commercial item or entity may be displayed on a visual display device.

In certain non-limiting embodiments, in collaborative filtering, a merchant geographic profile may be extended or expanded to account for correlations between geographic zones across multiple profiles for all merchants. For example, if a merchant is at the corner of a zip-code and a consumer is close to the merchant's zip-code but just beyond the zip-code's boundary, the intersection between the merchant's zip-code and the consumer's zip-code may be zero although the consumer is a short distance away from the merchant. This may result in poor recommendations. That is, the geographic profile of a particular merchant may be extended or expanded based on what is known about the geographic profiles of all of the merchants. In one non-limiting example, the information on all of the merchants may indicate which geographic zones tend to coexist in the merchants' profiles or are correlated in the merchants' profiles.

Figure 6B:
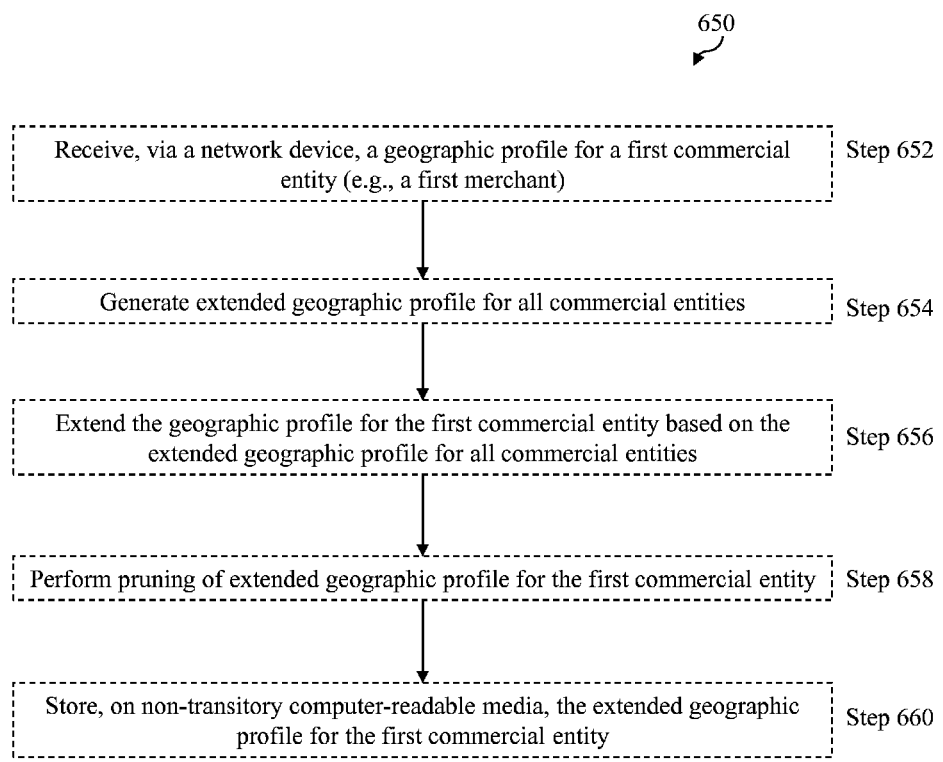
FIG. 6B is a flowchart illustrating a computer-executed method for generating an extended commercial entity geographic profile.

The exemplary technique for extending a first consumer's geographic profile as illustrated in FIG. 6B may be used to extend the geographic profile for a particular merchant based on an extended geographic profile for all merchants. FIG. 6B is a flowchart illustrating a computer-executed method 650 for generating an extended or expanded geographic profile for a particular first commercial entity (e.g., a first merchant). In this exemplary method, the first commercial entity's geographic profile (that includes an indication of geographic zones that the first commercial entity was present in at least once) may be expanded or extended based on information on geographic zones in the profiles of a plurality of commercial entities (e.g., all known commercial entities). That is, the geographic profile of the first commercial entity may be extended or expanded based on what is known about the geographic profiles of all of the commercial entities. In one non-limiting example, the information on all of the commercial entities may indicate which geographic zones tend to coexist in the commercial entities' geographic profiles or are correlated in the commercial entities' geographic profiles.

In step 652, data on the first commercial entity's unextended geographic profile may be received, via a network device. The geographic profile may indicate, for example, one or more geographic zones associated with the first commercial entity, one or more importance scores associated with the geographic zones, and a confidence score for the geographic profile.

In step 654, an extended geographic profile may be generated for all commercial entities to determine, for each geographic zone, which other geographic zones are typically seen along it on commercial entities' geographic profiles. In one exemplary non-limiting embodiment, the following technique may be used to generate the extended geographic profile for all commercial entities to generate a Z*Z matrix.

For each commercial entity
  a. For each geographic zone z1 in the commercial entity's profile
    1. Add the counts and importance scores of z2 on the (z1, z2) coordinate In one exemplary embodiment, the generated matrix may be made sparse by discarding all insignificant importance scores (i.e., scores below a threshold value or percentage).

In step 656, the geographic profile for the first commercial entity may be extended or expanded based on the extended geographic profile generated in step 654. In certain cases, the data in the extended geographic profile generated in step 654 may be normalized and weighted before extending the first commercial entity's geographic profile. A vector of normalized importance scores for geographic zones associated with the first commercial entity may be used. The vector may be denoted as [Iu1 . . . IuN] where N represents the total number of geographic zones for the first commercial entity. A single confidence score ($C_u$) associated with the first commercial entity may also be received. For the geographic zones in the first commercial entity's geographic profile, a matrix of cross-zone importance scores may be accessed or generated. The matrix may be denoted as $[[Iz11 \ldots Iz1M] \ldots [IzNM \ldots IzNM]]$.

The vector of extended commercial entity importance scores for all commercial entities may be denoted as $[Ie1 \ldots IeN]$, where Ie represents an importance score for an extended geographic profile, and N represents the total number of geographic zones for the first commercial entity after profile extension. In one example, the vector of extended commercial entity importance scores for all commercial entities may be generated by the weighted sum: $Iu1*[[Iz11 \ldots Iz1M]+ \ldots +IuN*[IzN1 \ldots IzNM]]$.

A vector or matrix of cross-zone confidence scores for the first commercial entity related to the outcome vector of step 654 may also be generated. The vector or matrix of confidence scores for the first commercial entity may be denoted as $[Cz1 \ldots CzN]$. An extended confidence score (Ce) for all commercial entities may be generated in relation to the vector of extended commercial entity importance scores. In one example, the extended confidence score for all commercial entities may be generated as the summation of each product of an unextended commercial entity importance score and a corresponding cross-geographic zone confidence score, as represented below.

$$Ce = Iu1*Cz1 + \ldots + IuN*CzN$$

A merge factor (alpha) may be generated between the first commercial entity's unextended geographic profile (as received or determined in step 652) and the extended geographic profile for all commercial entities (as received or indicated in step 654) by balancing the confidence scores of each. In one example, the merge factor (alpha) may be generated based on the confidence score of the extended geographic profile for all commercial entities, the confidence score of the first commercial entity's unextended geographic profile, and a custom weight (K) that determines the balance between the first commercial entity's unextended geographic profile and the extended geographic profile for all commercial entities. The merge factor (alpha) and/or the custom weight (K) may be set manually in some non-limiting embodiments, as part of a standard configuration and/or on a per-query basis. In one example, the merge factor (alpha) may be determined as follows:

$$alpha = K*Cu/(Cu+Ce)$$

The first commercial entity's unextended geographic profile may be merged with the extended geographic profile for all commercial entities to generate a final vector of importance values and a final confidence score for the geographic profile of the first commercial entity. In one example, the final vector of importance scores (I) for the first commercial entity's extended geographic profile may be determined as follows:

$$I = alpha*[Iu1 \ldots IuN] + (1-alpha)*[Ie1 \ldots IeN]$$

In one example, the final confidence score (C) for the first commercial entity's extended geographic profile may be determined as follows:

$$C = alpha*Cu + (1-alpha)*Ce$$

In step 658, in certain embodiments, the first commercial entity's extended geographic profile generated in step 658 may be pruned or trimmed to reduce their sizes and/or eliminate the largest profiles. In one example, all geographic zones in the extended geographic profile having importance scores less than a global threshold may be removed. In another example, all importance scores for the geographic profile may be normalized and then trimmed based on a threshold. In another example, the size of the geographic profile may be trimmed to an arbitrary maximum size. In another example, the size of the geographic profile may be trimmed to a relatively large number that guarantees richness of the profile (e.g., about 500 zones in the profile). The sizes may be re-normalized, and profiles that are likely to have little or no impact may be eliminated (e.g., importance scores less than about 0.01). In another example, an adaptive threshold may be selected, and the geographic profile sizes may be taken as an input variable. Then, profiles having sizes that exceed the adaptive threshold may be eliminated. In another example, an adaptive size limit may be set and used to trim geographic profiles based on their sizes.

In step 660, the final vector of importance scores (I) and the final confidence score (C) for the first commercial entity's geographic profile may be stored on a non-transitory computer-readable storage medium. In certain embodiments, the final vector of importance values (I) generated in FIG. 6B may be used in the methods of FIGS. 7-11 whenever importance values for a commercial entity's geographic profile are used in the methods, and the final confidence score (C) may be used whenever a confidence score for a commercial entity's geographic profile is used.

Figure 7A:
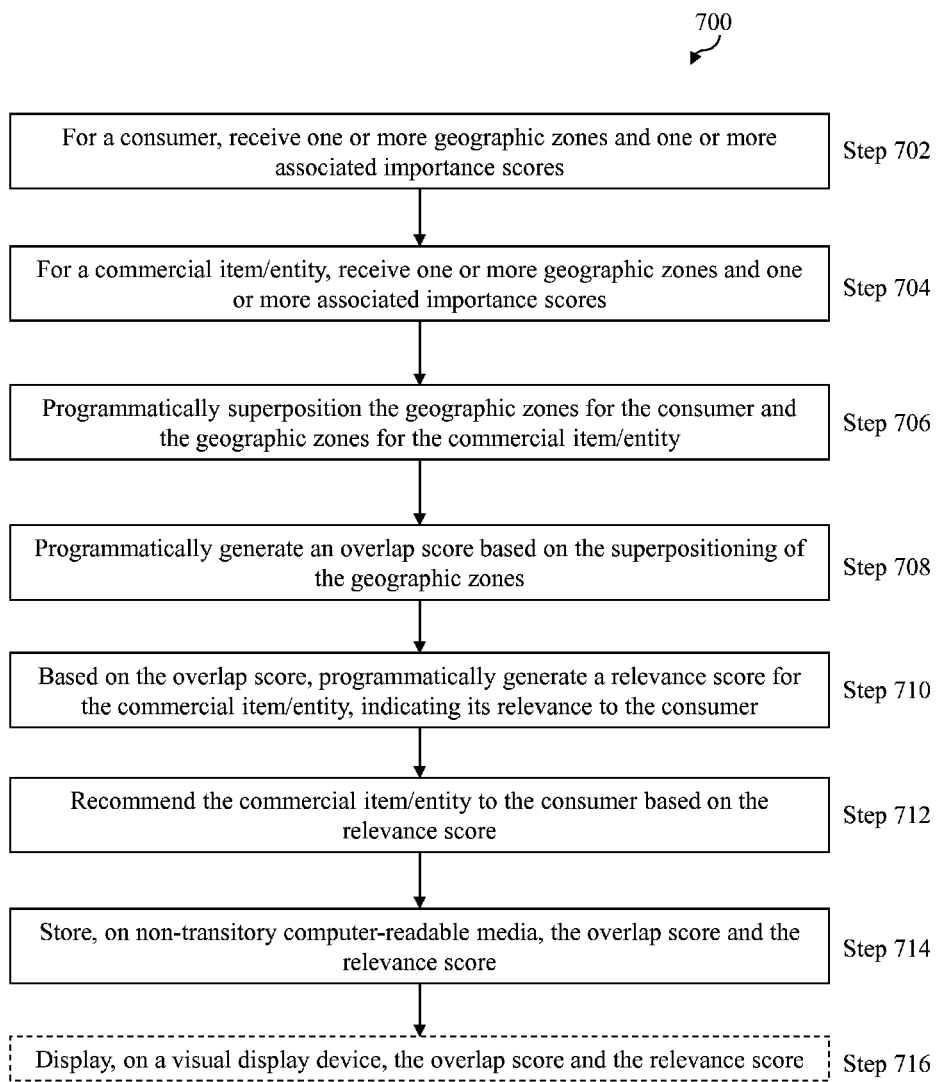
FIG. 7A is a flowchart illustrating a computer-executed method for recommending a particular commercial item (e.g., product, service, experience, promotion) or a particular commercial entity (e.g., merchant, service provider) to a particular consumer based on their geographic zones.

FIG. 7A is a flowchart illustrating a computer-executed method 700 for recommending a particular commercial item (e.g., product, service, experience, promotion) or a particular commercial entity (e.g., merchant, service provider) to a particular consumer based on their geographic zones.

In step 702, the purchase recommendation engine 218 may receive, from a non-transitory computer-readable storage via a network device, identification of one or more geographic zones associated with a consumer. The geographic profile may be an unextended geographic profile or an extended geographic profile for the consumer (as generated in the exemplary technique of FIG. 5). In one non-limiting example, the one or more geographic zones may be zones in which the consumer was previously physically present at least once. For example, the geographic zones may indicate the residential address of the consumer, the work address of the consumer, locations along one or more travel paths of the consumer, and the like. In certain embodiments, for each geographic zone, an importance score may be received. Each importance score may indicate the importance of the corresponding geographic zone to the consumer. In certain embodiments, for each geographic zone, a count may be received. Each count may indicate the number of times the consumer was present in or was associated with the corresponding geographic zone.

In one exemplary embodiment in which the geographic zone data is stored on a database, the purchase recommendation engine 218 may execute a database "get" command to retrieve the data in step 702. In this example, the data may be received in the form of a database table. Table 1 below illustrates exemplary geographic zone information relevant to a particular consumer, as received in step 702.

TABLE 1

Exemplary geographic zone information
relevant to a particular consumer

| Geographic Zone | Count | Total Importance |
|---|---|---|
| 00000 | 3 | 3 |
| 00001 | 1 | 5 |
| 00002 | 4 | 8 |

Table 1: Exemplary Geographic Zone Information Relevant to a Particular Consumer In step 704, the purchase recommendation engine 218 may receive, from a non-transitory computer-readable storage via a network device, identification of one or more geographic zones associated with a commercial item or entity. The geographic profile may be an unextended geographic profile or an extended geographic profile for the commercial item or entity. In one non-limiting example, the one or more geographic zones may be zones in which the commercial item or entity is located or was previously physically present at least once. For example, the geographic zones may indicate the business address of a merchant, the store locations of a merchant, the store locations at which a commercial item is available for purchase, a location at which a service or experience is offered, and the like. In certain embodiments, for each geographic zone, an importance score may be received. Each importance score may indicate the importance of the corresponding geographic zone to the commercial item or entity. In certain embodiments, for each geographic zone, a count may be received. Each count may indicate the number of times the commercial item or entity was present in or was associated with the corresponding geographic zone.

In one exemplary embodiment in which the geographic zone data is stored on a database, the purchase recommendation engine 218 may execute a database "get" command to retrieve the data in step 704. In this example, the data may be received in the form of a database table. Table 2 below illustrates exemplary geographic zone information relevant to a particular commercial item or entity, as received in step 704.

TABLE 2

Exemplary geographic zone information
relevant to a particular commercial item or entity

| Geographic Zone | Count | Total Importance |
|---|---|---|
| 00000 | 1 | 10 |
| 00001 | 3 | 3 |
| 00002 | 2 | 3 |

Table 2: Exemplary Geographic Zone Information Relevant to a Particular Commercial Item or Entity In step 706, the overlap detection engine 216 may superposition the geographic zone information obtained for the consumer and the geographic information obtained for the commercial item or entity in order to determine how likely the consumer is to be at the location of to travel to the location of the commercial item or entity. If the consumer's geographic zones overlap to a substantial degree with the geographic zones of the commercial item or entity, this indicates that the commercial item or entity is geographically proximal to the consumer and that, therefore, the consumer is more likely to visit the location of the commercial item or entity to make a purchase.

In one example, the overlap detection engine 216 may execute a database join operation to generate a superpositioning of the geographic information. Table 3 below illustrates exemplary geographic zone information obtained by superpositioning geographic zone information of the consumer and the commercial item/entity.

TABLE 3

Exemplary geographic zone information based on superpositioning of geographic zone information for the consumer and the commercial item/entity

| Geographic Zone | Commerical Item/Entity Count | Importance for Commercial Item/Entity | Consumer Count | Importance for Consumer |
|---|---|---|---|---|
| 00000 | 1 | 10 | 3 | 3 |
| 00001 | 3 | 3 | 1 | 5 |
| 00002 | 2 | 3 | 4 | 8 |

Table 3: Exemplary Geographic Zone Information Based on Superpositioning of Geographic Zone Information for the Consumer and the Commercial Item/Entity In step 708, the overlap detection engine 216 may generate an overlap score which is a numeric value that quantitatively indicates the extent to which the geographic zones of the consumer overlap with the geographic zones of the commercial item or entity, i.e., the extent to which the consumer and commercial item/entity geographic zones intersect. That is, the higher the overlap score, the greater is the overlap between the geographic zones of the consumer and the commercial item/entity. In certain embodiments, the overlap score does not require and does not generate any actual geographic distances between the locations/zones of the consumer and the locations/zones of the commercial item/entity.

In one non-limiting example, the overlap score may be generated by generating a sum of the total importance values in Table 3. In one example, the total importance values may be based on the summation of the importance values over all geographic zones and over both the consumer and the commercial item/entity to generate the overlap score. In some cases, the overlap score may be the raw summed value, which for the exemplary data in Table 3, is 32. In some cases, the overlap score may be generated by summing the total importance values and by normalizing and capping the summed value, which for the exemplary data in Table 3, is min ($32/100$, 1.0).

In step 710, the recommendation generation engine 218 may use the overlap score generated in step 708 to generate a relevance score, which is a numeric value that quantitatively indicates a probability or likelihood that the consumer will purchase the commercial item or will purchase from the commercial entity. In one non-limiting example, the relevance score may take into one or more factors in addition to the overlap score: e.g., profile data items for the consumer (e.g., age, gender, occupation), prior activities of the consumer (e.g., subject matter or category of prior purchases), characteristics of the commercial item or entity (e.g., subject matter, category, sub-category), and the like.

In step 712, based on the relevance score, the recommendation generation engine 218 may either recommend the commercial item or entity to the consumer (e.g., if the relevance score is above a particular threshold) or not recommend the commercial item or entity to the consumer (e.g., if the relevance score is below a particular threshold). If the commercial item or entity is to be recommended to the consumer, the recommendation generation engine 218 may generate and transmit one or more computer-executable instructions to a computing device associated with the consumer (e.g., a computer or a smartphone) to cause the computing device to display an indication of the commercial item or entity with information that will facilitate a purchase by the consumer. In some cases, the recommendation generation engine 218 may indicate a ranking of the commercial item or entity among other commercial items or entities based on the relevance score and/or the overlap score.

Figure 12:
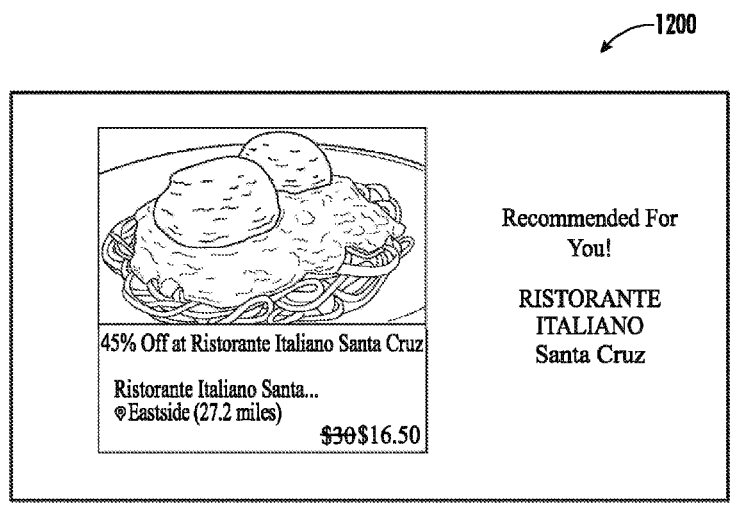
FIG. 12 illustrates an exemplary user interface rendered on a display of a consumer's computer device that indicates a commercial entity recommended for a consumer based on geographic proximity, i.e., the geographic overlap score.

FIG. 12 illustrates an exemplary user interface 1200 rendered on a display of a consumer's computer device that indicates a commercial entity recommended for a consumer based on geographic proximity, i.e., the geographic overlap score, and a promotion associated with the commercial entity.

Returning to FIG. 7A, in step 714, the overlap score and/or the relevance score may be stored on a non-transitory computer-readable storage medium in association with identifications of the consumer and the commercial item or entity. The stored scores may be updated periodically or by prompting from a database engineer or user as new geographic data is obtained for the consumer and/or the commercial item or entity.

In step 716, in certain embodiments, the overlap score and/or the relevance score may be displayed on a visual display device.

Figure 7B:
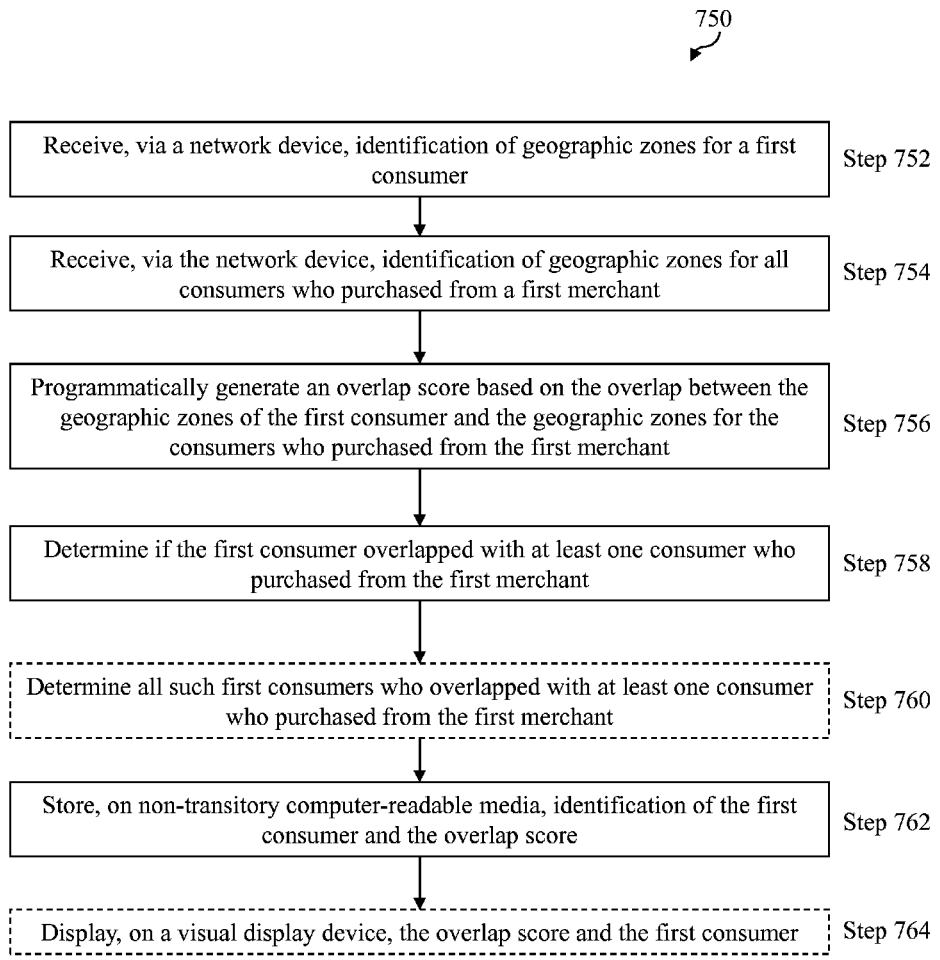
FIG. 7B is a flowchart illustrating a computer-executed method for determining if a first merchant is geographically accessible to a first consumer to assess whether the first consumer is likely to purchase from the first merchant.

FIG. 7B is a flowchart illustrating a computer-executed method 750 for determining if a first merchant is geographically accessible to a first consumer to assess whether the first consumer is likely to purchase from the first merchant. In step 752, the geographic profile for a first consumer may be received or accessed. The geographic profile may be an unextended geographic profile or an extended geographic profile for the first consumer (as generated in the exemplary technique of FIG. 5). The geographic profile accessed in step 752 may indicate, for example, the geographic zones associated with the first consumer.

In step 754, the geographic profiles for all consumers who purchased from a first merchant may be received or accessed. The geographic profiles may be unextended geographic profiles or extended geographic profiles for the consumers (as generated in the exemplary technique of FIG. 5). The geographic profiles accessed in step 754 may indicate, for example, the geographic zones associated with the consumers who purchased from the first merchant.

In step 756, the overlap generation engine 216 may programmatically determine if the first consumer's geographic zones overlap with the geographic zones of at least one consumer who purchased from the first merchant. The overlap generation engine 216 may, for example, generate an overlap score to quantitatively indicate the level of the overlap. If the geographic zones of the first consumer overlaps with the geographic zones of at least one consumer who purchased from the first merchant, it may be determined that the first consumer is geographically proximal to the consumers who purchased from the first merchant, that the first merchant is geographically accessible to the first consumer, and that the first consumer is also likely to purchase from the first merchant.

In step 760, in a non-limiting embodiment, all such first consumers whose geographic zones overlap with those of the consumers who purchased from the first merchant may be determined.

In step 762, if the first merchant is determined to be geographically accessible to the first consumer, an identification of the first consumer and the overlap score may be stored on a non-transitory computer-readable storage medium.

In step 764, the identification of the first consumer and, optionally the overlap score, may be displayed on a visual display device to indicate that the first consumer is likely to purchase from the first merchant. This display may be used, for example, to provide targeted advertisements and/or promotions regarding the first merchant to the first consumer.

Figure 8:
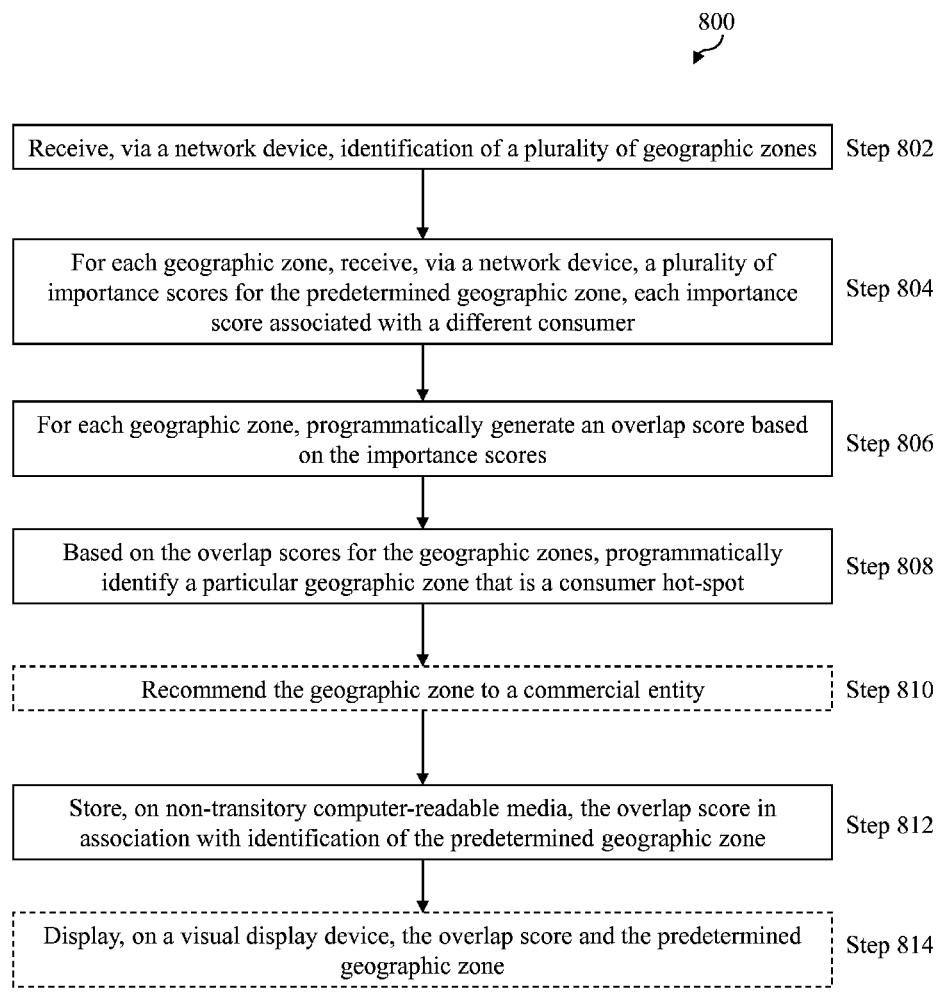
FIG. 8 is a flowchart illustrating a computer-executed method for detecting a consumer hot-spot, i.e., a particular geographic zone characterized by a high volume, density and/or frequency of consumer presence or activity.

FIG. 8 is a flowchart illustrating a computer-executed method 800 for detecting a consumer hot-spot, i.e., a particular geographic zone characterized by a high volume, density and/or frequency of consumer presence or activity.

In step 802, the overlap detection engine 216 may receive, from a non-transitory computer-readable storage via a network device, identification of a plurality of predetermined geographic zones. The method 800 may be executed to identify one or more geographic zones from among the plurality of predetermined geographic zones that are consumer hot-spots.

In step 804, a plurality of importance scores for each predetermined geographic zone may be received. The importance scores may be associated with different consumers with each importance score indicating how important or relevant the predetermined geographic zone is to a different consumer. For example, a first importance score may indicate how important or relevant the predetermined geographic zone is to a first consumer, while a second importance score may indicate how important or relevant the predetermined geographic zone is to a second consumer.

In step 806, for each predetermined geographic zone, an overlap score (which is a numeric value that quantitatively indicates the extent to which the different consumers overlap at the geographic zone) may be received or generated. That is, the higher the overlap score, the greater is the overlap among multiple consumers at the geographic zone.

In one non-limiting example, the overlap score may be generated by generating a sum of the total importance values for the different consumers at the geographic zone. In one example, the total importance values may be based on the summation of the importance values of the different consumers at the geographic zone. In some cases, the overlap score may be the raw summed value. In some cases, the overlap score may be generated by summing the total importance values and by normalizing and capping the summed value.

In step 808, the overlap detection engine 216 may compare the overlap scores for the different geographic zones. Based on the comparison, the overlap detection engine 216 may programmatically identify one or more geographic zones that are consumer hot-spots. In one example, if the overlap score for a particular geographic zone is above a threshold value, then that geographic zone may be identified to be a consumer hot-spot. The threshold value may be generated based on, for example, overlap scores for a plurality of geographic zones, the average of the overlap scores, the standard deviation in the overlap scores, and the like. In another example, the geographic zones that have the highest one or more overlap scores may be identified to be consumer hot-spots.

In step 810, the recommendation generation engine 218 may use the overlap score generated in step 806 to recommend the consumer hot-spot geographic zone to a commercial entity (e.g., merchant). This is because the consumer hot-spots are zones where consumers can be found in a high volume, density and/or frequency, and therefore the consumer hot-spots are likely to result in more commercial activity than zones that are not consumer hot-spots. As a result, the commercial entity (e.g., merchant) may consider whether to provide commercial items at the consumer hot-spots to take advantage of the high consumer volume, density and/or frequency at the hot-spots. If the consumer hot-spot is to be recommended to a commercial entity, the recommendation generation engine 218 may generate and transmit one or more computer-executable instructions to a computing device associated with the commercial entity (e.g., a computer or a smartphone) to cause the computing device to display an indication of the geographic zone(s) that are identified as consumer hot-spots.

In one exemplary embodiment, the consumer hot-spot may be recommended to a commercial entity if at least a certain percentage of the consumers whose geographic profile includes the hot-spot previously purchased from the commercial entity. In this case, embodiments may determine whether the consumers (whose geographic profile includes the hot-spot) purchased from the commercial entity. If a percentage of consumers (whose geographic profile includes the hot-spot) above a predetermined threshold percentage purchased from the commercial entity, then computer-executable instructions may be transmitted to a computing device associated with the commercial entity to render a representation of the consumer hot-spot.

In another exemplary embodiment, the consumer hot-spot may be recommended to a commercial entity if the profile data of the consumers (whose geographic profile includes the hot-spot) indicates that the consumers may be interested in the commercial entity. In this case, embodiments may receive profile data associated with the consumers whose geographic profile includes the hot-spot, and may receive information on the commercial entity. The profile data on the consumers may include, without limitation, age, location, address, gender, occupation, income, price preference, purchase category preference, purchase sub-category preference, purchase subject matter preference, one or more interests, one or more hobbies, and the like. The information on the commercial entity may include, without limitation, a sale category, a sale sub-category, a sale subject matter, one or more prices, one or more store locations, and the like. Based on the profile data of each consumer (whose geographic profile includes the hot-spot) and the information on the commercial entity, embodiments may generate a relevancy score associated with the particular consumer to indicate a probability that the consumer will purchase from the commercial entity. The relevancy scores of all consumers (whose geographic profile includes the hot-spot) may be summed or otherwise aggregated to generate an aggregate relevancy score to indicate a probability that the consumers in the consumer hot-spot will purchase from the commercial entity. If the aggregate relevancy score is above a predetermined threshold, then computer-executable instructions may be transmitted to a computing device associated with the commercial entity to render a representation of the consumer hot-spot.

Figure 13:
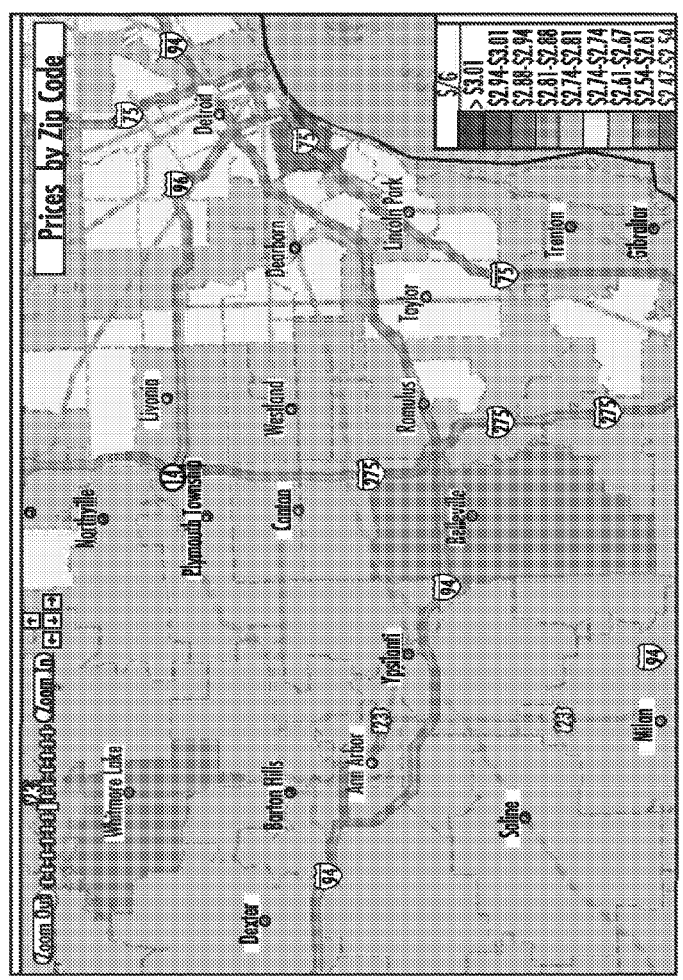
FIG. 13 illustrates an exemplary user interface rendered on a display of a merchant's computer device that indicates a map of a geographic zone that is a consumer or commercial hot-spot, optionally indicating merchants and/or price ranges located in the geographic zone.

FIG. 13 illustrates an exemplary user interface 1300 rendered on a display of a merchant's computer device that indicates a map of a geographic zone that is a consumer hot-spot, optionally indicating merchants and/or price ranges located in the geographic zone.

Returning to FIG. 8, in step 812, the overlap scores may be stored on a non-transitory computer-readable storage medium in association with identification of the corresponding geographic zones. The stored scores may be updated periodically or by prompting from a database engineer or user as new geographic data is obtained for consumers.

In step 814, in certain embodiments, the overlap scores and/or the corresponding geographic zones may be displayed on a visual display device.

Figure 9:
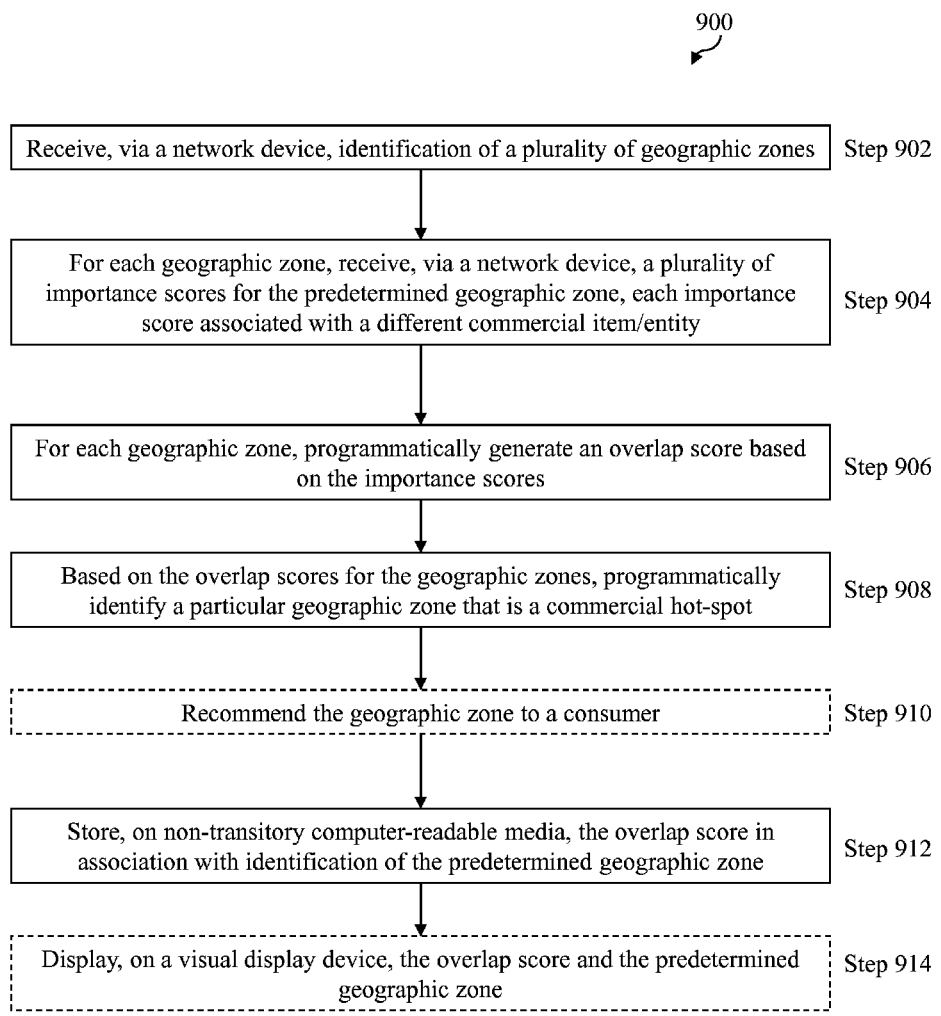
FIG. 9 is a flowchart illustrating a computer-executed method for detecting a commercial hot-spot, i.e., a particular geographic zone characterized by a high volume, density and/or frequency of commercial presence or activity.

FIG. 9 is a flowchart illustrating a computer-executed method 900 for detecting a commercial hot-spot, i.e., a particular geographic zone characterized by a high volume, density and/or frequency of commercial presence or activity.

In step 902, the overlap detection engine 216 may receive, from a non-transitory computer-readable storage via a network device, identification of a plurality of predetermined geographic zone. The method 900 may be executed to identify one or more geographic zones from among the plurality of predetermined geographic zones that are commercial hot-spots.

In step 904, the overlap detection engine 216 may receive, from a non-transitory computer-readable storage via a network device, a plurality of importance scores for each predetermined geographic zone. The importance zones may be associated with different commercial items or entities with each importance score indicating how important or relevant the predetermined geographic zone is to a different commercial item or entity. For example, a first importance score may indicate how important or relevant the predetermined geographic zone is to a first commercial item/entity, while a second importance score may indicate how important or relevant the predetermined geographic zone is to a second commercial item/entity.

In step 906, for each predetermined geographic zone, the overlap detection engine 216 may generate an overlap score which is a numeric value that quantitatively indicates the extent to which the different commercial items/entities overlap at the geographic zone. That is, the higher the overlap score, the greater is the overlap among multiple commercial items/entities at the geographic zone.

In one non-limiting example, the overlap score may be generated by generating a sum of the total importance values for the different commercial items/entities at the geographic zone. In one example, the total importance values may be based on the summation of the importance values of the different commercial items/entities at the geographic zone. In some cases, the overlap score may be the raw summed value. In some cases, the overlap score may be generated by summing the total importance values and by normalizing and capping the summed value.

In step 908, the overlap detection engine 216 may compare the overlap scores for the different geographic zones. Based on the comparison, the overlap detection engine 216 may programmatically identify one or more geographic zones that are commercial hot-spots. In one example, if the overlap score for a particular geographic zone is above a threshold value, then that geographic zone may be identified to be a commercial hot-spot. The threshold value may be based on, for example, overlap scores for a plurality of geographic zones, the average of the overlap scores, the standard deviation in the overlap scores, and the like. In another example, the geographic zones that have the highest one or more overlap scores may be identified to be commercial hot-spots.

In step 910, the recommendation generation engine 218 may use the overlap score to recommend the commercial hot-spot geographic zone to a consumer. Commercial hot-spots are zones where commercial items/entities can be found in a high volume, density and/or frequency. Thus, the commercial hot-spots are likely to be of interest to a consumer looking to partake in commercial activities. If the commercial hot-spot is to be recommended to a consumer, the recommendation generation engine 218 may generate and transmit one or more computer-executable instructions to a computing device associated with the consumer (e.g., a computer or a smartphone) to cause the computing device to display an indication of the geographic zone(s) that are identified as commercial hot-spots.

In one exemplary embodiment, the commercial hot-spot may be recommended to a consumer if at least a certain percentage of the merchants whose geographic profile includes the hot-spot previously sold to the consumer. In this case, embodiments may determine whether the merchants (whose geographic profile includes the hot-spot) previously sold to the consumer. If a percentage of merchants (whose geographic profile includes the hot-spot) above a predetermined threshold percentage previously sold to the consumer, then computer-executable instructions may be transmitted to a computing device associated with the consumer to render a representation of the commercial hot-spot.

In another exemplary embodiment, the commercial hot-spot may be recommended to a consumer if the profile data of the merchants (whose geographic profile includes the hot-spot) indicates that the merchants may be of interest to the consumer. In this case, embodiments may receive profile data associated with the consumer, and may receive information on the merchants whose geographic profiles include the commercial hot-spot. The profile data on the consumer may include, without limitation, age, location, address, gender, occupation, income, price preference, purchase category preference, purchase sub-category preference, purchase subject matter preference, one or more interests, one or more hobbies, and the like. The information on the merchants may include, without limitation, a sale category, a sale sub-category, a sale subject matter, one or more prices, one or more store locations, and the like. Based on the information on each merchant (whose geographic profile includes the hot-spot) and the profile data of the consumer, embodiments may generate a relevancy score associated with the particular merchant to indicate a probability that the consumer will purchase from the merchant. The relevancy scores of all merchants (whose geographic profiles include the hot-spot) may be summed or otherwise aggregated to generate an aggregate relevancy score to indicate a probability that the consumer will purchase from the merchants in the commercial hot-spot. If the aggregate relevancy score is above a predetermined threshold, then computer-executable instructions may be transmitted to a computing device associated with the consumer to render a representation of the commercial hot-spot.

FIG. 13 illustrates an exemplary user interface rendered on a display of a consumer's computer device that indicates a map of a geographic zone that is a commercial hot-spot, optionally indicating merchants and/or price ranges located in the geographic zone.

Returning to FIG. 9, in step 912, the overlap scores may be stored on a non-transitory computer-readable storage medium in association with identification of the corresponding geographic zones. The stored scores may be updated periodically or by prompting from a database engineer or user as new geographic data is obtained for commercial items/entities.

In step 914, in certain embodiments, the overlap scores and/or the corresponding geographic zones may be displayed on a visual display device.

Figure 10:
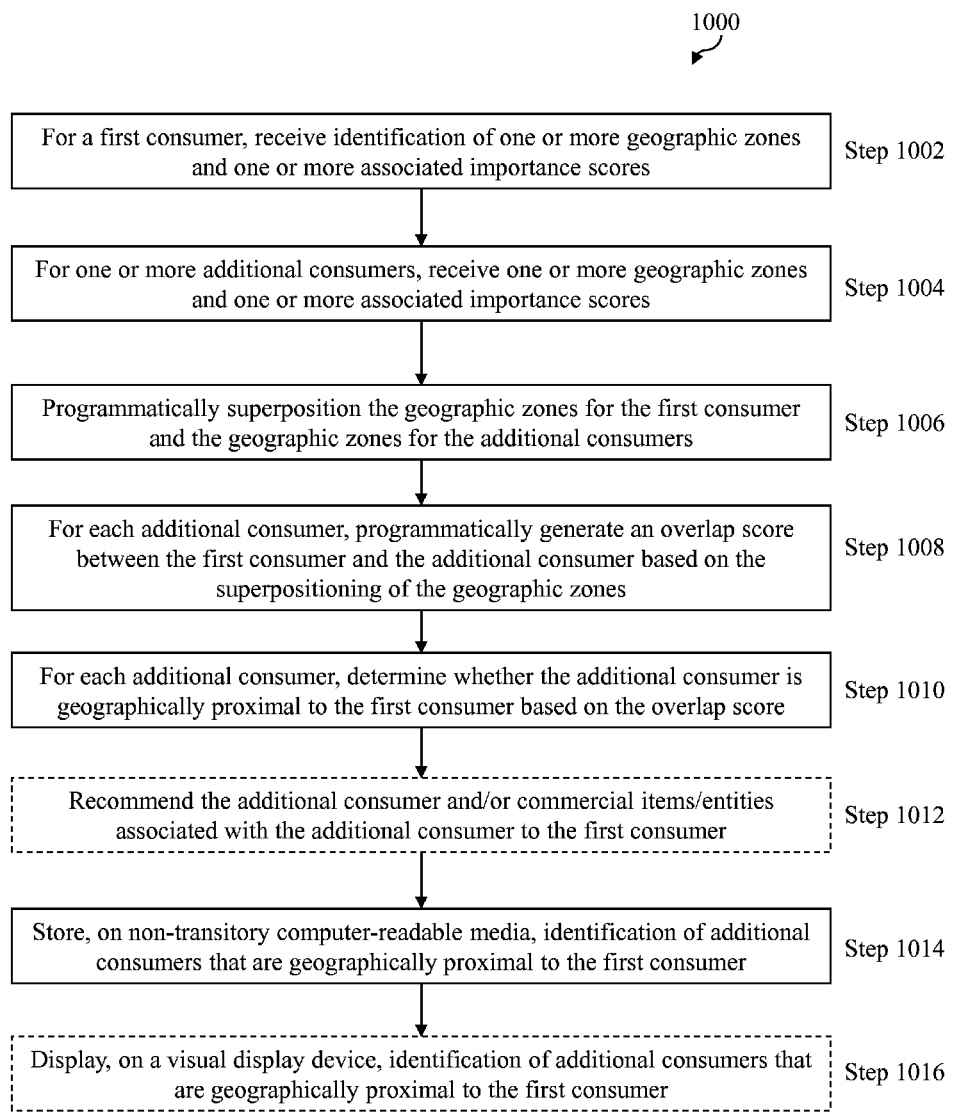
FIG. 10 is a flowchart illustrating a computer-executed method for detecting one or more additional consumers who are geographically proximal to a first consumer.

FIG. 10 is a flowchart illustrating a computer-executed method 1000 for detecting one or more additional consumers who are geographically proximal to a first consumer.

In step 1002, the overlap detection engine 216 may receive, from a non-transitory computer-readable storage via a network device, identification of one or more geographic zones and one or more associated importance scores for the first consumer.

In step 1004, the overlap detection engine 216 may receive, from a non-transitory computer-readable storage via a network device, identification of one or more geographic zones and one or more associated importance scores for the additional consumers.

In step 1006, the overlap detection engine 216 may superposition the geographic zone information obtained for the first consumer and the geographic zone information obtained for the additional consumers. If the first consumer's geographic zones overlap to a substantial degree with the geographic zones of the additional consumers, this indicates that the additional consumers are geographically proximal to the first consumer.

In step 1008, for each additional consumer, the overlap detection engine 216 may generate an overlap score which is a numeric value that quantitatively indicates the extent to which the first consumer and the additional consumer overlap in their geographic zones.

In one non-limiting example, the overlap score may be generated by generating a sum of the total importance values for the consumers at the geographic zones. In one example, the total importance values may be based on the summation of the importance values of the different consumers at the geographic zone. In some cases, the overlap score may be the raw summed value. In some cases, the overlap score may be generated by summing the total importance values and by normalizing and capping the summed value.

In step 1010, for each additional consumer, the overlap detection engine 216 may determine whether the additional consumer is geographically proximal to the first consumer based on the overlap score. In one example, if the overlap score for a particular additional consumer is above a threshold value, then that additional consumer may be identified to be geographically proximal to the first consumer. The threshold value may be based on, for example, the average of the overlap scores, the standard deviation in the overlap scores, and the like. In another example, the additional consumers who have the highest one or more overlap scores relative to the first consumer may be identified to be geographically proximal to the first consumer.

In step 1012, if an additional consumer is determined to be geographically proximal to the first consumer, the recommendation generation engine 218 may recommend commercial items/entities to the first consumer based on the prior purchase data of the additional consumer. In certain cases, an additional consumer may be ranked among other additional consumers based on its overlap score relative to the first consumer.

In step 1014, the identification of additional consumers who are geographically proximal to the first consumer may be stored on a non-transitory computer-readable storage medium.

In step 1016, in certain embodiments, the identification of additional consumers who are geographically proximal to the first consumer may be displayed on a visual display device.

Figure 11:
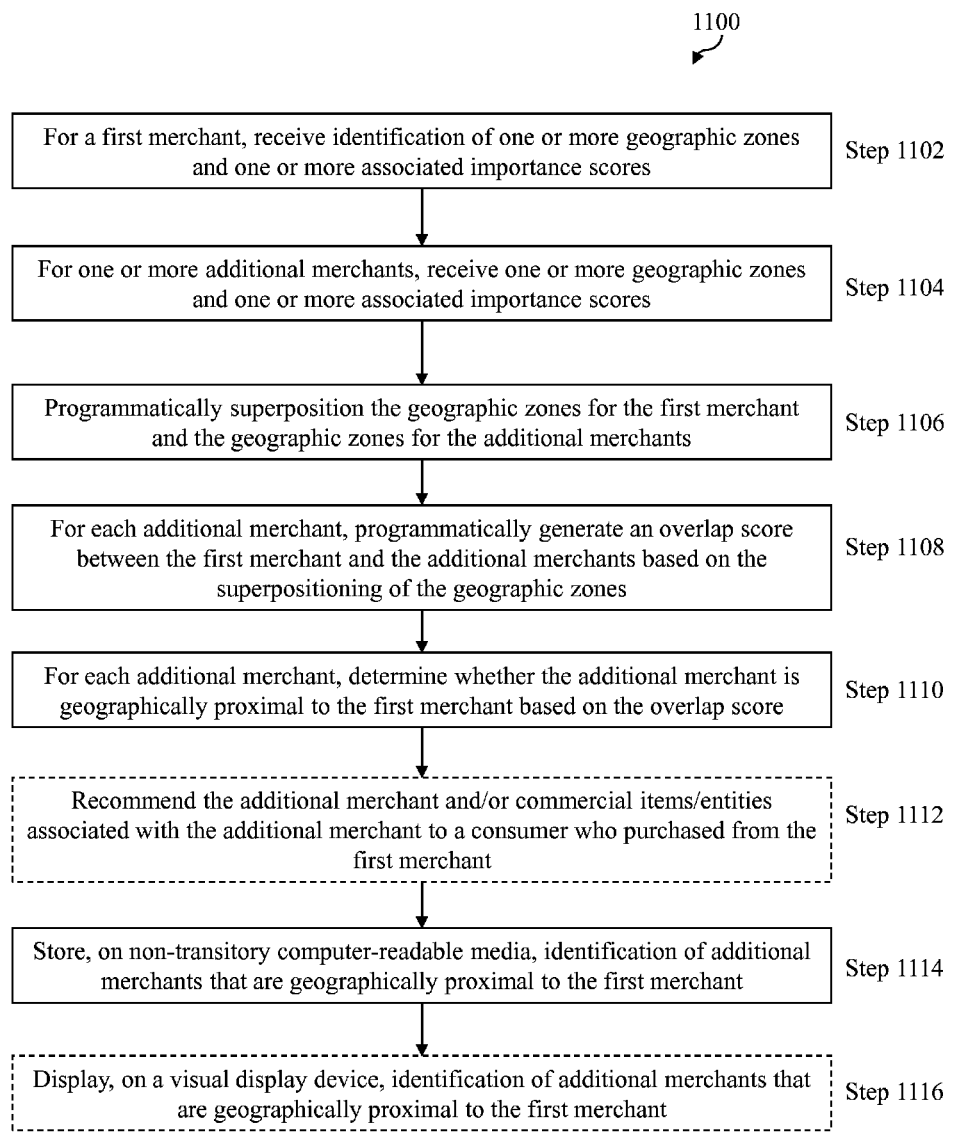
FIG. 11 is a flowchart illustrating a computer-executed method for detecting one or more additional commercial items/entities that are geographically proximal to a first commercial item/entity.

FIG. 11 is a flowchart illustrating a computer-executed method 1100 for detecting one or more additional commercial items/entities that are geographically proximal to a first commercial item/entity.

In step 1102, the overlap detection engine 216 may receive, from a non-transitory computer-readable storage via a network device, identification of one or more geographic zones and one or more associated importance scores for the first commercial item/entity.

In step 1104, the overlap detection engine 216 may receive, from a non-transitory computer-readable storage via a network device, identification of one or more geographic zones and one or more associated importance scores for the additional commercial items/entities.

In step 1106, the overlap detection engine 216 may superposition the geographic zone information obtained for the first commercial item/entity and the geographic zone information obtained for the additional commercial items/entities. If the first commercial item/entity's geographic zones overlap to a substantial degree with the geographic zones of the additional commercial items/entities, this indicates that the additional commercial items/entities are geographically proximal to the first commercial item/entity.

In step 1108, for each additional commercial item/entity, the overlap detection engine 216 may generate an overlap score which is a numeric value that quantitatively indicates the extent to which the first commercial item/entity and the additional commercial item/entity overlap in the geographic zones.

In one non-limiting example, the overlap score may be generated by generating a sum of the total importance values for the commercial items/entities at the geographic zones. In one example, the total importance values may be based on the summation of the importance values of the different commercial items/entities at the geographic zone. In some cases, the overlap score may be the raw summed value. In some cases, the overlap score may be generated by summing the total importance values and by normalizing and capping the summed value.

In step 1110, for each additional commercial item/entity, the overlap detection engine 216 may determine whether the additional commercial item/entity is geographically proximal to the first commercial item/entity based on the overlap score. In one example, if the overlap score for a particular additional commercial item/entity is above a threshold value, then that additional commercial item/entity may be identified to be geographically proximal to the first commercial item/entity. The threshold value may be based on, for example, the average of the overlap scores, the standard deviation in the overlap scores, and the like. In another example, the additional commercial items/entities that have the highest one or more overlap scores relative to the first commercial item/entity may be identified to be geographically proximal to the first commercial item/entity.

In step 1112, if an additional commercial item/entity is determined to be geographically proximal to the first commercial item/entity, the recommendation generation engine 218 may recommend the additional commercial item/entity to a consumer who purchased from the first commercial item/entity. In certain cases, an additional commercial item/entity may be ranked among other additional commercial items/entities based on its overlap score relative to the first commercial item/entity.

In step 1114, the identification of additional commercial items/entities that are geographically proximal to the first commercial item/entity may be stored on a non-transitory computer-readable storage medium.

In step 1116, in certain embodiments, the identification of additional commercial items/entities that are geographically proximal to the first commercial item/entity may be displayed on a visual display device.

VII. Exemplification

(a) Experimental Setup

An exemplification of certain exemplary embodiments is described in this section merely for illustrative purposes, and is not meant to limit the invention.

An initial geographic area was initially selected, which included the city of San Francisco and the surrounding area. The selected geographic area included a mix of urban and suburban environments. The formal definition of the geographic area was the box bounded by the following latitude, longitude values: (38.323, −122.874) to (36.942, −121.507). This geographic area encompassed 1,472,664 consumers and 202,000 merchants.

Table 4 summarizes distribution of the different types of location data for the consumers. In certain embodiments, the types of location data may be determined heuristically based on factors including, but not limited to, the source of the data, the type of action taken by the consumer that resulted in the location data being accessed, the channel where the location data is transmitted, and the like. An "active" location data type refers to a consumer's location data obtained when the consumer interacts with a mobile computing device, for example, when a consumer performs a search for nearby merchants. A "passive" location data type refers to a consumer's location data obtained from the consumer's mobile computing device without it being a direct response to an action performed by the consumer. A "home" location data type refers to a location associated with a consumer's residential address. A "play" location data type refers to a location associated with a recreational or entertainment location visited by a consumer, e.g., a country club of which the consumer is a member. A "work" location data type refers to a location associated with a consumer's work address. A "favorite" location data type refers to a favorite location associated with a consumer, for example, the consumer's favorite restaurant. An "other" location data type refers to other locations that do not fall within the remaining location data types indicated in Table 4.

| Type of Location Data | Number of Distinct Consumer | Count |
| --- | --- | --- |
| Active | 496,853 | 92,461,145 |
| Passive | 306,993 | 702,785,428 |
| Home | 662,304 | 715,968 |
| Play | 501,016 | 558,799 |
| Other | 1,873 | 2,717 |
| Work | 51,988 | 53,490 |
| Favorite | 56 | 59 |

Table 4: Distribution of Consumer Location Data

It was determined that the overlap of consumers across different types of location data was about 37% on average. This number was obtained by comparing the global number of distinct consumers with the sum of distinct consumers across types. The number indicates that a significant number of consumers were present in more than one type of location data.

It was also determined that 77.6% of consumers had a single location data point. Exemplary embodiments were used to tackle the sparseness of the data by collaborative filtering of location data.

Labels were identified, in which a label is defined as any existing purchase of a promotion offered by a promotion and marketing system in which both the merchant and the consumer resided within the selected geographic area. Duplicate purchases by the same consumer and merchant were ignored. 1,909,680 labels, 275,521 consumers and 5,349 merchants resulted from the identification of labels.

A conventional technique of determining geographic proximity was used as the baseline. The baseline technique ranked merchants suitable for a consumer based on the approximate Euclidean distance between the consumer's location data and the merchant's location data. The location data coordinates were used directly, adjusted by median and average parallel lengths in the area. One example formula used for determining the approximate Euclidean distance is: square root of (consumer's latitude−merchant's latitude)*111.0*(consumer's latitude−merchant's latitude)*111.0+ (consumer's longitude−merchant's longitude)*80.0*(consumer's longitude−merchant's longitude)*80.0). This exemplary non-limiting formula is appropriate and reasonable for the test area, and does not limit the scope of this invention. Other example formulae may also be used.

In certain cases, it may not be possible to generate a rank for every single merchant. As such, conventional techniques that only rank a subset of merchants (e.g., those in a single geographic division or radius) are in a clear disadvantage. To solve this technical problem, several baselines were generated where the ranked list of merchants was generated for different distance thresholds. For example, lists of merchants were generated for distance thresholds of about 0.5 km, 5 km and infinity.

For the baselines (generated using conventional techniques) and for applications of exemplary embodiments, metrics of precision and recall were computed for direct comparison. The precision or positive predictive value is the fraction of retrieved instances that are relevant, while the recall or sensitivity is the fraction of relevant instances that are retrieved. Additionally, the distance between a label and the optimal position it should have had on the list is averaged across all labels and consumers. This averaged distance is the "average positional error (APE)." In a scheme defining an optimal position, all merchants with a purchase are ranked at the top (i.e., are ranked first), while any deviation from this scheme is considered an error.

In general, a set of merchants are evaluated for a single consumer, and the merchants are sorted by the scores (e.g., precision, recall). It is determined if the merchants have a purchase, and the positions of the merchants in the sorted list are assessed. This procedure is repeated across all consumers, and the average precision, average recall and average positional error are calculated.

In performing techniques provided by exemplary embodiments, two types of geographic segmentation were used to account for differences in granularity, compression, variable or fixed sizes, semantic meaning, and the like. Consumer and merchant locations were mapped to corresponding geographic zones. In one instance, the geographic area was segmented into zip-codes, mapping each set of location coordinates to the U.S. zip-code to which it belongs. In another instance, the geographic area was segmented into a grid based on partitioning each set of location coordinates by trimming their latitudes and longitudes to two decimal places, thus generating segments in a grid that roughly corresponds to a 1×1 km square. The latitude and longitude values were then hashed to generate a unique geographic zone ID for the set of location coordinates. For example, the location data point having coordinates (38.01, −121.95) was mapped to a geographic zone having an ID 136859805. It was determined that a few consumers had mappings to many geographic zones, while the vast majority of consumers had mappings to a few geographic zones.

Figure 14:
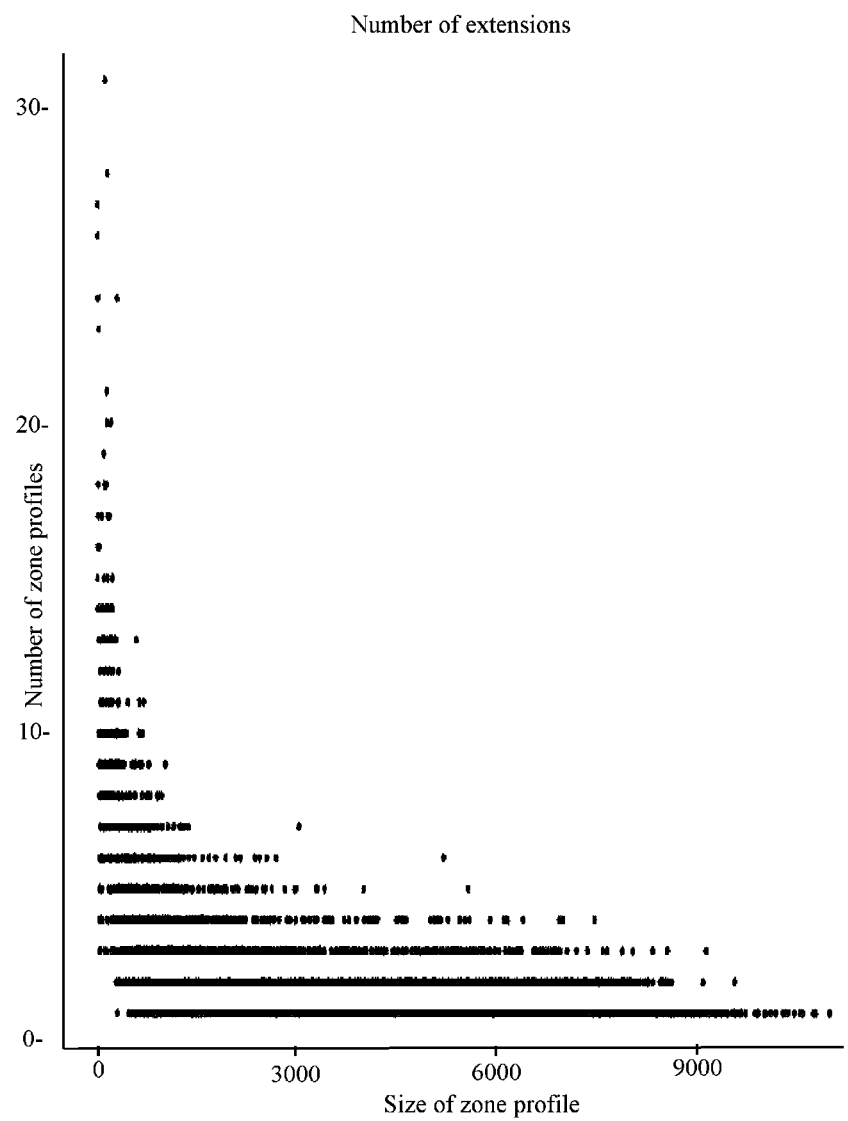
FIG. 14 is a graph illustrating the distribution of consumer geographic profiles in terms of the number of profiles (y-axis) at different profile sizes (x-axis).

Since a large proportion of correlations exist among geographic zones of a consumer's geographic profile, it may be more efficient to generate a smaller consumer geographic profile including a smaller set of geographic zones. FIG. 14 is a graph illustrating the distribution of consumer geographic profiles in terms of the number of profiles (y-axis) at different profile sizes (x-axis). The graph shows that the number of consumer geographic profiles is skewed toward smaller profiles, but that there is a wide diversity of profile sizes.

In certain embodiments, the consumer geographic profile may be trimmed to reduce its size, i.e., by decreasing the number of geographic zones indicated in the profile. In one example, all geographic zones in the profile having weights less than a global threshold may be removed. In another example, all weights for a given consumer geographic profile may be normalized and then trimmed based on a threshold. In another example, the size of each consumer geographic profile may be trimmed to an arbitrary maximum size. In another example, the size of each consumer geographic profile may be trimmed to a relatively large number that guarantees richness of the profile (e.g., 500 zones in the profile). The sizes may be re-normalized, and profiles that are likely to have little or no impact may be eliminated (e.g., importance scores less than about 0.01). In another example, an adaptive threshold may be selected, and the consumer geographic profile sizes may be taken as an input variable. Then, profiles having sizes that exceed the adaptive threshold may be eliminated. In another example, an adaptive size limit may be set and used to trim consumer geographic profiles based on their sizes.

In this exemplification, an adaptive threshold was selected, and the consumer geographic profile sizes were taken as an input variable. The adaptive threshold (t) was set to be $0.25 (\log (n))^2/n$, where n is the number of zones in a profile. The basis behind the adaptive threshold is that $1/n$ would eliminate all weights below average, which on a power-law distribution would eliminate the long tail. The numerator adds a logarithmic factor to the base average, lowering or raising it as needed. This trimming technique reduced the size of larger-sized profiles to more manageable sizes.

Figure 15:
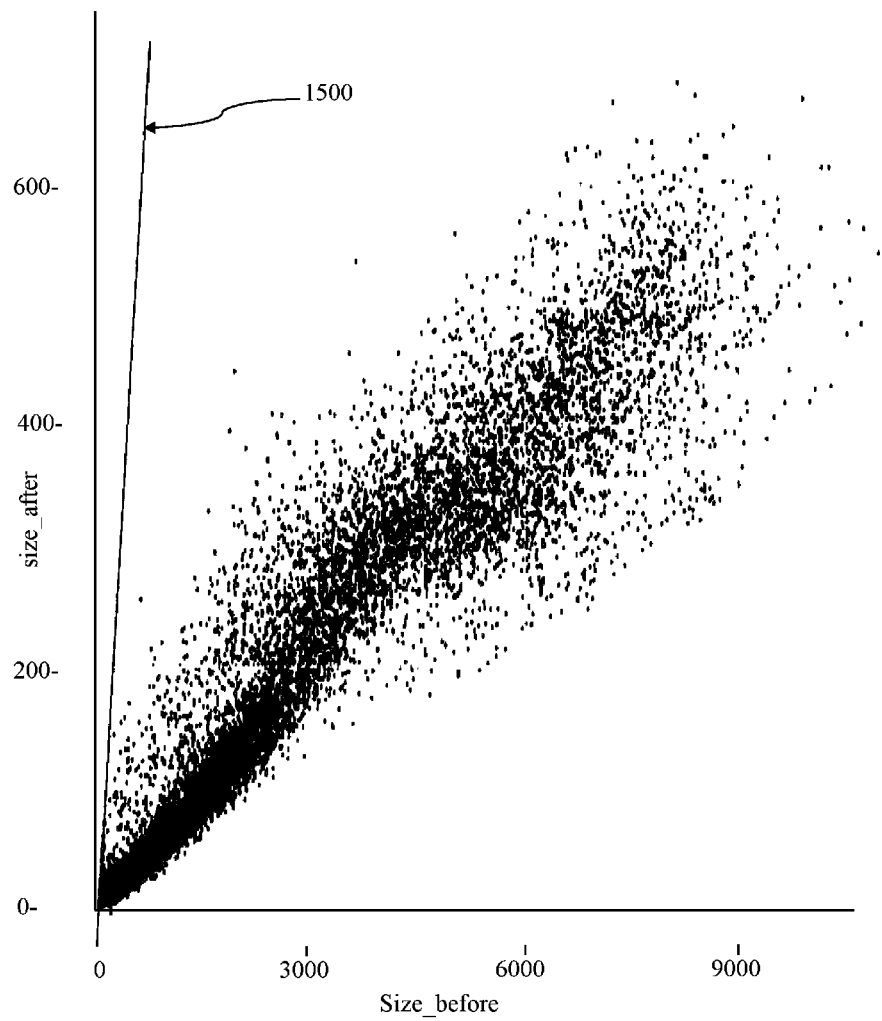
FIG. 15 is a graph illustrating the distribution of consumer geographic profiles in terms of their size before (x-axis) and after (y-axis) trimming of the profiles.

FIG. 15 is a graph illustrating the distribution of consumer geographic profiles in terms of their size before (x-axis) and after (y-axis) trimming of the profiles. The straight line 1500 represents consumer geographic profiles that did not change in size. The consumer geographic profiles were not trimmed to a particular fixed size, maintaining a significant number of profiles of size around 600 other geographic zones. Additionally, the sizes of the smallest consumer geographic profiles were preserved by the trimming technique, as can be seen in FIG. 16.

Figure 16:
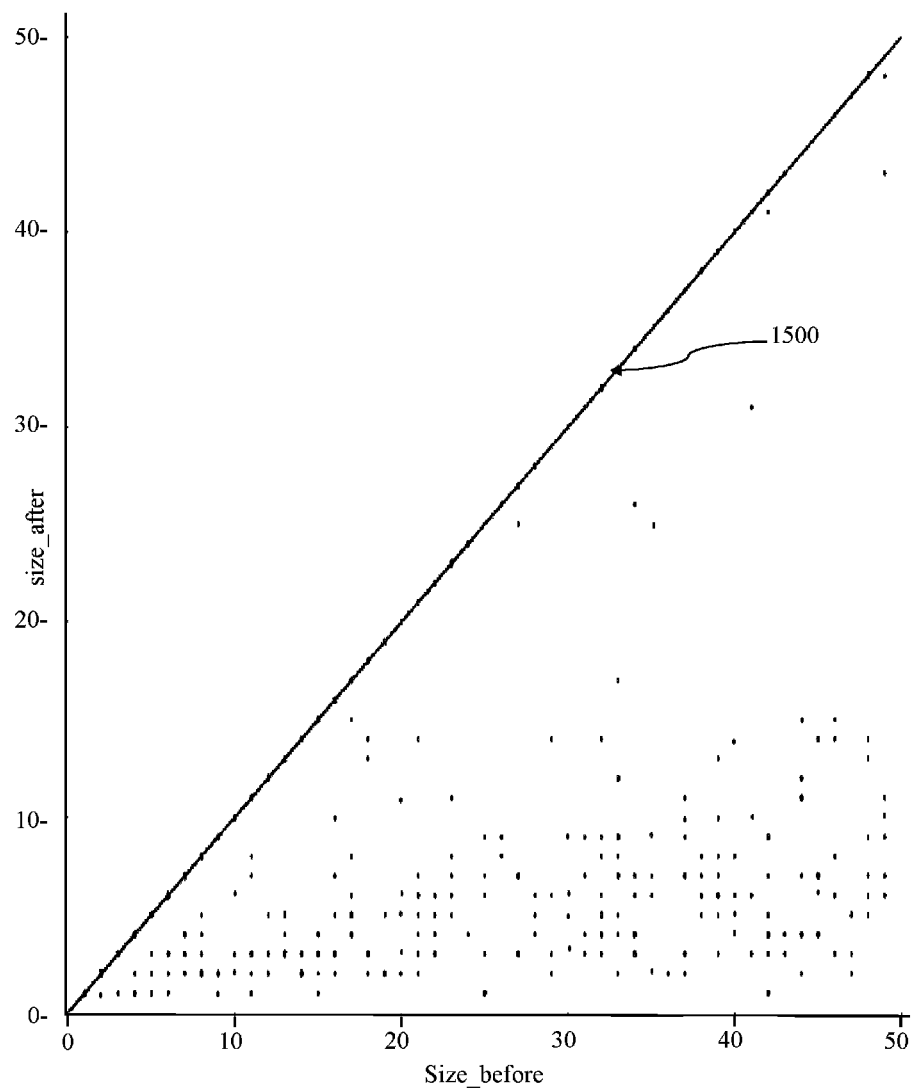
FIG. 16 is a graph illustrating an expanded view of a portion of the graph of FIG. 15.

FIG. 16 is a graph illustrating an expanded view of a portion of the graph of FIG. 15. The graph shows that the sizes of the consumer geographic profiles were reduced after the trimming procedure, even at small sizes.

Figure 17:
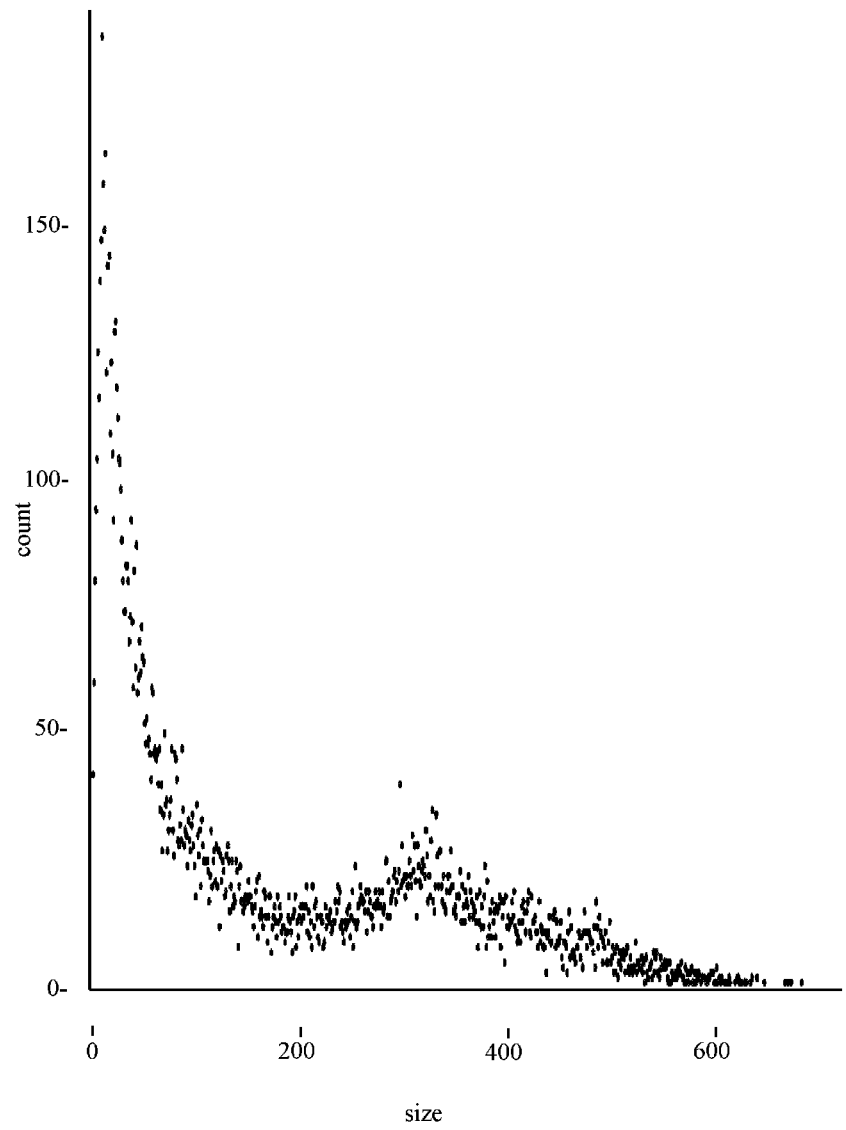
FIG. 17 is a graph illustrating the distribution of consumer geographic profiles as shown in the number of such profiles (y-axis) versus the size of the consumer geographic profiles (x-axis) after a trimming procedure.

FIG. 17 is a graph illustrating the distribution of consumer geographic profiles as shown in the number of such profiles (y-axis) versus the size of the consumer geographic profiles (x-axis) after the trimming procedure. The roughly inverse proportionality shows that, after trimming, the consumer geographic profiles mostly had a manageable size and were therefore manageable in terms of computation. That is, the sizes of the consumer geographic profiles were significantly reduced while still generating valuable extended geographic profile data.

(b) Results

Table 5 summarizes resulting outcomes for the grid segmentation and zip-code techniques provided by exemplary embodiments.

TABLE 5

Results for the grid segmentation and zip-code techniques provided by exemplary embodiments

| Type | Grid2 | Zipcode |
|---|---|---|
| Number of mapped consumers | 1,525,463 | 1,514,948 |
| Number of geographic zones | 13,581 | 634 |
| # of importance scores (aggregated) | 16,353,799 (1.9%) | 7,644,509 (0.9%) |
| Size of consumer profile (avg) | 10.7 | 5.0 |
| Number of geographic zone correlations | 32,519,332 | 137,678 |
| Number of geographic zones with no expansions | 40 | 86 |
| Number of profile extensions after pruning | 2.236.007 (6.8%) | 22,105 (16.0%) |
| Size of extended profile (avg) | 660.1 | 86.6 |

For the baseline conventional technique using a distance threshold of about 0.5 km, an APE of about 2685 was obtained. Table 6 below summarizes precision, recall and F1 (F-measure) values that resulted from the baseline conventional technique using a distance threshold of about 0.5 km. The F1 F-measure is a measure that combines precision and recall and is the harmonic mean of precision and recall. The highlighted entries correspond to the best values obtained across all techniques assessed. Each row corresponds to a different size limitation on the list of merchant recommendations.

TABLE 6

Summary of results of baseline conventional technique using a distance threshold of about 0.5 km

| Fold | Precision | Recall | F1 |
|---|---|---|---|
| @0001 | 0.023% | 0.006% | 0.010% |
| @0002 | 0.017% | 0.008% | 0.011% |
| @0004 | 0.015% | 0.013% | 0.014% |
| @0008 | 0.012% | 0.020% | 0.015% |
| @0016 | 0.009% | 0.027% | 0.013% |
| @0032 | 0.006% | 0.031% | 0.010% |
| @0064 | 0.006% | 0.035% | 0.010% |
| @0128 | 0.016% | 0.067% | 0.026% |
| @0256 | 0.043% | 0.366% | 0.077% |
| @0512 | 0.073% | 1.779% | 0.141% |
| @1024 | 0.098% | 6.726% | 0.194% |
| @2048 | 0.121% | 26.888% | 0.242% |
| @4096 | 0.137% | 89.938% | 0.273% |
| @5383 | 0.129% | 100.000% | 0.257% |

For the baseline conventional technique using a distance threshold of about 5 km, an APE of about 2671 was obtained. Table 7 below summarizes precision, recall and F1 values that resulted from the baseline conventional technique using a distance threshold of about 5 km. The highlighted entries correspond to the best values across all techniques assessed. Each row corresponds to a different size limitation on the list of merchant recommendations.

TABLE 7

Summary of results of baseline conventional technique using a distance threshold of about 5 km

| Fold | Precision | Recall | F1 |
|---|---|---|---|
| @0001 | 0.041% | 0.010% | 0.017% |
| @0002 | 0.037% | 0.016% | 0.023% |
| @0004 | 0.037% | 0.031% | 0.034% |
| @0008 | 0.035% | 0.055% | 0.043% |
| @0016 | 0.035% | 0.113% | 0.053% |
| @0032 | 0.030% | 0.184% | 0.051% |
| @0064 | 0.027% | 0.286% | 0.049% |
| @0128 | 0.032% | 0.438% | 0.060% |
| @0256 | 0.053% | 0.823% | 0.100% |
| @0512 | 0.079% | 2.274% | 0.152% |
| @1024 | 0.101% | 7.250% | 0.199% |
| @2048 | 0.122% | 27.281% | 0.244% |
| @4096 | 0.137% | 89.998% | 0.273% |
| @5383 | 0.129% | 100.000% | 0.257% |

For the baseline conventional technique using an unlimited distance threshold (i.e., infinity), an APE of about 2648 was obtained. Table 8 below summarizes precision, recall and F1 values that resulted from the baseline conventional technique using an unlimited distance threshold. The highlighted entries correspond to the best values across all techniques assessed. Each row corresponds to a different size limitation on the list of merchant recommendations.

TABLE 8

Summary of results of baseline conventional technique using an unlimited distance threshold

| Fold | Precision | Recall | F1 |
|---|---|---|---|
| @0001 | 0.041% | 0.011% | 0.017% |
| @0002 | 0.037% | 0.017% | 0.023% |
| @0004 | 0.038% | 0.032% | 0.035% |
| @0008 | 0.035% | 0.056% | 0.043% |
| @0016 | 0.036% | 0.118% | 0.055% |
| @0032 | 0.032% | 0.204% | 0.055% |
| @0064 | 0.030% | 0.339% | 0.055% |
| @0128 | 0.037% | 0.570% | 0.070% |
| @0256 | 0.059% | 1.137% | 0.113% |
| @0512 | 0.084% | 2.832% | 0.164% |
| @1024 | 0.105% | 8.063% | 0.208% |
| @2048 | 0.125% | 28.128% | 0.248% |
| @4096 | 0.137% | 90.072% | 0.274% |
| @5383 | 0.129% | 100.000% | 0.257% |

For the exemplary technique using grid segmentation for geographical zones, an APE of about 2207 was obtained. Table 9 below summarizes precision, recall and F1 values that resulted from the exemplary technique using grid segmentation. The highlighted entries correspond to the best values across all techniques assessed. Each row corresponds to a different size limitation on the list of merchant recommendations.

TABLE 9

Summary of results of exemplary technique using grid segmentation for geographical zones

| Fold | Precision | Recall | F1 |
|---|---|---|---|
| @0001 | 0.127% | 0.022% | 0.037% |
| @0002 | 0.122% | 0.043% | 0.064% |
| @0004 | 0.111% | 0.077% | 0.091% |
| @0008 | 0.102% | 0.140% | 0.118% |
| @0016 | 0.093% | 0.245% | 0.135% |
| @0032 | 0.091% | 0.456% | 0.152% |

TABLE 9-continued

Summary of results of exemplary technique using
grid segmentation for geographical zones

| Fold | Precision | Recall | F1 |
|---|---|---|---|
| @0064 | 0.087% | 0.827% | 0.157% |
| @0128 | 0.086% | 1.636% | 0.162% |
| @0256 | 0.087% | 3.413% | 0.170% |
| @0512 | 0.093% | 7.378% | 0.184% |
| @1024 | 0.110% | 17.691% | 0.218% |
| @2048 | 0.156% | 50.279% | 0.311% |
| @4096 | 0.150% | 91.522% | 0.300% |
| @5383 | 0.129% | 100.000% | 0.257% |

For the exemplary technique using zip-codes for geographical zones, an APE of about 2231 was obtained. Table 10 below summarizes precision, recall and F1 values that resulted from the exemplary technique using zip-codes. The highlighted entries correspond to the best values across all techniques assessed. Each row corresponds to a different size limitation on the list of merchant recommendations.

TABLE 10

Summary of results of exemplary technique
using zip-codes for geographical zones

| Fold | Precision | Recall | F1 |
|---|---|---|---|
| @0001 | 0.072% | 0.009% | 0.016% |
| @0002 | 0.077% | 0.021% | 0.033% |
| @0004 | 0.078% | 0.043% | 0.056% |
| @0008 | 0.078% | 0.086% | 0.082% |
| @0016 | 0.078% | 0.170% | 0.107% |
| @0032 | 0.077% | 0.324% | 0.124% |
| @0064 | 0.074% | 0.612% | 0.131% |
| @0128 | 0.073% | 1.203% | 0.137% |
| @0256 | 0.075% | 2.473% | 0.145% |
| @0512 | 0.084% | 5.544% | 0.165% |
| @1024 | 0.102% | 14.400% | 0.203% |
| @2048 | 0.162% | 51.881% | 0.323% |
| @4096 | 0.150% | 91.495% | 0.300% |
| @5383 | 0.129% | 100.000% | 0.257% |

(c) Discussion

The techniques provided by exemplary embodiments (using grid segmentation and zip-codes for geographic zones) presented significant technical improvements over the baseline conventional techniques. The grid segmentation technique presented the most improved results, while the zip-code technique achieved considerably more compression in the amount of location data required. These improvements are clearly represented in a sample of the results table, which are used to generate recommendation lists limited to 16 results, as summarized in Table 11 below.

TABLE 11

Comparison of results across techniques
used for recommendation lists of size 16

| Algorithm | Precision | Recall | F1 |
|---|---|---|---|
| Baseline - 0.5 kms | 0.009% | 0.027% | 0.013% |
| Baseline - 5.0 kms | 0.035% | 0.113% | 0.053% |
| Baseline-Unlimited | 0.036% | 0.118% | 0.055% |
| Zipcode | 0.078% | 0.170% | 0.107% |
| Grid-2 | 0.093% | 0.245% | 0.135% |

Exemplary techniques used collaborative filtering, which proved to provide significant technical advantages. This is seen in the fact that the grid segmentation segments (used in a technique provided by exemplary embodiments) were almost identical in size to the 0.5-km radius areas (used in a baseline conventional technique), but results for the former were significantly better that those of the latter in terms of precision and recall across the board. For example, precision values of the former technique were up to 16 times better, and recall values of the former technique were up to 24 times better in the best cases.

APE values for the techniques provided by exemplary embodiments were significantly lower than APE values for the baseline conventional techniques. With both techniques provided by exemplary embodiments (i.e., the grid segmentation technique and the zip-code technique), relevant merchants were around 400 positions higher in the list of recommendations as compared to the baseline convention techniques.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by $\frac{1}{20}$th, $\frac{1}{10}$th, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications, combinations and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications, combinations and other embodiments are intended to be included within the scope of the appended claims. Although specific terms are employed herein, they are used in a generic and descriptive sense only and not for purposes of limitation.

What is claimed is:

1. An apparatus configured to programmatically identify geographic zone information for consumers based on an overlap score determined from location data but without reliance on point-to-point distance calculations, comprising:
   a network device configured to:
      receive a first geographic location associated with a consumer; and
      access a plurality of identifications of geographic locations associated with the consumer from a geographic location identification repository, the plurality of identifications of geographic locations comprising at least a predetermined home address and a predetermined work address for the consumer; and
   a geographic zone designation engine configured to:
   programmatically identify a first set of geographic zones including a selected geographic zone associated with the first geographic location wherein the selected geographic zone is identified from a plurality of predetermined geographic zones comprising the selected geographic zone;
   programmatically identify another set of geographic zones which also includes the selected geographic zone, each of the zones of the another set of geographic zones associated with a first merchant;
   an importance generation engine configured to:
   programmatically generate a first geographic importance score indicating a predicted importance of at least the selected geographic zone to the consumer, wherein the first geographic importance score is generated based at least in part on the predetermined home address associated with the consumer, the predetermined work address for the consumer, and the plurality of identifications of geographic locations associated with the consumer, and the first geographic importance score is programmatically determined by obtaining a count for the consumer of location data points for the consumer indicating presence in the selected geographic zone, and dividing the count for the consumer over a total number of location data points for the consumer indicating presence in all of the first set of geographic zones;
   programmatically generate a second importance score associated with the first merchant for the selected geographic zone, and the second importance score is programmatically determined by obtaining a count for the first merchant of location data points for the first merchant indicating presence in the selected geographic zone, and dividing the count for the first merchant over a total number of location data points for the first merchant indicating presence in all of the another set of geographic zones;
   programmatically generate an overlap score by generating a sum of the total importance scores at the selected geographic zone for at least the consumer and the first merchant, wherein the overlap score is programmatically generated without determination of actual point-to-point geographic distances;
   programmatically use collaborative filtering to generate a consumer extended geographic profile to account for correlations between geographic zones across multiple profiles, the collaborative filtering comprising:
      receive, via the network device, a geographic profile for the consumer, programmatically generate an extended geographic profile for identified consumers,
      extend the geographic profile for the consumer based on the extended geographic profile for the identified consumers,
      prune the extended geographic profile for the consumer by removing geographic zones in the extended geographic profile of the consumer having importance scores less than a predetermined threshold value;
   and a non-transitory computer-readable medium configured to store the selected geographic zone and the first geographic importance score associated with the consumer.

2. The apparatus of claim 1, wherein the first geographic location is received from a consumer device associated with the consumer.

3. The apparatus of claim 1, wherein the first geographic location indicates at least one selected from a group of:
   a location at which the consumer was previously present;
   the predetermined home address of the consumer, the predetermined work address of the consumer, or a favorite address of the consumer; or
   a location at which the consumer purchased a commercial item.

4. The apparatus of claim 1, wherein
   the network device is further configured to receive a second geographic location associated with the consumer, the first geographic location associated with a first time period, the second geographic location associated with a second time period, and wherein the first and second time periods within a predetermined range of each other; and
   the geographic zone designation engine is further configured to, upon programmatically determining that the first and second geographic locations are within the predetermined range of each other, discard the second geographic location.

5. The apparatus of claim 1, wherein
   the network device is further configured to receive identifications of the plurality of predetermined geographic zones; or
   the geographic zone designation engine is further configured to programmatically generate the plurality of predetermined geographic zones.

6. The apparatus of claim 1, wherein the importance generation engine is configured to programmatically generate the first geographic importance score further based on one or more selected from a group of the following factors: a verification status of the first geographic zone, and a frequency at which the consumer is present at the first geographic zone.

7. The apparatus of claim 1, wherein:
   the non-transitory computer-readable medium is further configured to store the count for the consumer, the selected geographic zone and the first geographic importance score.

8. The apparatus of claim 1, wherein the first geographic importance score indicates a probability of the consumer visiting or being present at the selected geographic zone.

9. The apparatus of claim 1, wherein the network device is further configured to access, from the non-transitory computer-readable medium, a plurality of geographic zones associated with the consumer.

10. The apparatus of claim 1, wherein the network device is further configured to access, from the non-transitory computer-readable medium, a plurality of consumers associated with the selected geographic zone.

11. The apparatus of claim 1, wherein the selected geographic zone is a zip-code corresponding to the first geographic location.

12. The apparatus of claim 1, wherein the geographic zone designation engine is further configured to programmatically generate the selected geographic zone by generating a hash value of latitude and longitude values of the first geographic location.

13. The apparatus of claim 1, wherein the importance generation engine is further configured to:
 programmatically generate an association between the selected geographic zone and a second geographic zone associated with the consumer; and
 programmatically generate a cross-zone importance score for the association, the cross-zone importance score generated based on the first geographic importance score associated with the selected geographic zone for the consumer and based on a second importance score associated with the second geographic zone for the consumer.

14. The apparatus of claim 1, wherein the first geographic importance score is associated solely with the selected geographic zone.

15. The apparatus of claim 1, wherein the first geographic importance score is associated with the selected geographic zone and one or more additional geographic zones.

16. The apparatus of claim 15, wherein:
 the network device is further configured to receive a plurality of geographic zones associated with a plurality of consumers; and
 the importance generation engine is further configured to:
  programmatically generate one or more correlations among the plurality of geographic zones; and
  based on the one or more correlations among the plurality of geographic zones and based on the selected geographic zone associated with the consumer, programmatically identify a second geographic zone associated with the consumer.

17. The apparatus of claim 16, wherein the importance generation engine is further configured to programmatically generate a second importance score for the second geographic zone associated with the consumer.

18. The apparatus of claim 1, wherein:
 the importance generation engine is further configured to:
  programmatically generate a relevancy score based on the overlap score, the relevancy score indicating a probability that the first merchant is of relevance to the consumer;
  store, on the non-transitory computer-readable medium, the relevancy score in association with identifications of the consumer and the first merchant; and
  based on the relevancy score, transmit computer-executable instructions via the network device to a consumer device associated with the consumer to cause the consumer device to render a representation of the first merchant.

19. The apparatus of claim 18, wherein the network device is further configured to transmit computer-executable instructions to the consumer device associated with the consumer to cause the consumer device to render a promotion provided by a promotion and marketing service for a product, service or experience associated with the first merchant.

20. The apparatus of claim 1, wherein:
 the network device is further configured to:
  receive a second set of geographic zones including the selected zone and associated with one or more consumers who purchased from the first merchant; and
 the importance generation engine is further configured to:
  programmatically generate a one or more consumers importance score for the selected geographic zone and associated with the one or more consumers who purchased from the first merchant;
  programmatically generate the overlap score by generating a sum of the total importance scores at the selected geographic zone for the consumer, the one or more consumers who purchased from the first merchant and, the first merchant;
  based on the overlap score, determine if the first merchant is geographically accessible to the consumer; and
  if the first merchant is determined to be geographically accessible to the consumer, transmit computer-executable instructions via the network device to a consumer device associated with the consumer to cause the consumer device to render a representation of the first merchant.

21. The apparatus of claim 20, wherein the network device is further configured to transmit computer-executable instructions to the consumer device associated with the consumer to cause the consumer device to render a promotion provided by a promotion and marketing service for a product, service or experience associated with the first merchant.

* * * * *